US012668553B2

(12) United States Patent
Tombuloglu et al.

(10) Patent No.: US 12,668,553 B2
(45) Date of Patent: **\*Jun. 30, 2026**

(54) MANGANESE ZINC SPINEL FERRITE (Mn$_{0.5}$Zn$_{0.5}$Fe$_2$O$_4$) NANOPARTICLES FOR THE GROWTH PROMOTION OF PLANTS

(71) Applicant: Imam Abdulrahman Bin Faisal University, Dammam (SA)

(72) Inventors: Guzin Tombuloglu, Dammam (SA); Huseyin Tombuloglu, Dammam (SA); Yassine Slimani, Dammam (SA); Munirah Almessiere, Dammam (SA); Abdulhadi Baykal, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 274 days.

This patent is subject to a terminal disclaimer.

(21) Appl. No.: 18/480,993

(22) Filed: Oct. 4, 2023

(65) Prior Publication Data

US 2025/0115530 A1    Apr. 10, 2025

(51) Int. Cl.
| | |
|---|---|
| *C05G 3/60* | (2020.01) |
| *C05D 9/02* | (2006.01) |
| *C05G 5/14* | (2020.01) |

(52) U.S. Cl.
CPC ................. *C05G 5/14* (2020.02); *C05D 9/02* (2013.01); *C05G 3/60* (2020.02)

(58) Field of Classification Search
None
See application file for complete search history.

(56) References Cited

U.S. PATENT DOCUMENTS

| | | | | |
|---|---|---|---|---|
| 2004/0200128 | A1* | 10/2004 | Metcalfe | A01M 1/106 |
| | | | | 43/107 |
| 2021/0122681 | A1 | 4/2021 | Sawant et al. | |
| 2021/0329866 | A1* | 10/2021 | Superak | A01H 1/06 |

FOREIGN PATENT DOCUMENTS

| | | |
|---|---|---|
| CN | 1063861 A | 8/1992 |
| CN | 114586614 A | 6/2022 |
| IN | 202131037062 | 2/2023 |

OTHER PUBLICATIONS

Tombuloglu et al. Journal of Soil Science and Plant Nutrition vol. 23, pp. 3561-3574. (Year: 2023).*
Hoagland et al. California agricultural experiment station, 347 (2nd edit). (Year: 1950).*
Tombuloglu et al. Environmental Nanotechnology, Monitoring, and Management vol. 11, 100223. (Year: 2019).*
Thakur et al. Ceramics International vol. 46, pp. 15740-15763. (Year: 2020).*
Abbas et al. Journal of Alloys and Compounds 644, pp. 774-782. (Year: 2015).*
Shebl et al. ; Template-free microwave-assisted hydrothermal synthesis of manganese zinc ferrite as a nanofertilizer for squash plant (*Cucurbita pepo* L) ; Heliyon 6 (2020) ; Mar. 11, 2020 ; 13 Pages.
Cantu et al. ; Tomato Fruit Nutritional Quality Is Altered by the Foliar Application of Various Metal Oxide Nanomaterials ; Nanomaterials 2022, 12 ; Jul. 9, 2022 ; 18 Pages.
Abdelhameed et al. ; Tracking of Zinc Ferrite Nanoparticle Effects on Pea (*Pisum sativum* L.) Plant Growth, Pigments, Mineral Content and Arbuscular Mycorrhizal Colonization ; Plants 2021, 10, 583 ; Mar. 19, 2021 ; 17 Pages.

\* cited by examiner

*Primary Examiner* — Katherine Peebles
(74) *Attorney, Agent, or Firm* — Oblon, McClelland, Maier & Neustadt, L.L.P.

(57)    ABSTRACT

A method of fertilizing a plant including applying a composition to a root of the plant. The composition includes a spinel ferrite with a formula of Mn$_x$Zn$_y$Fe$_2$O$_4$, where x+y=1. Particles of the spinel ferrite are spherical and have an average diameter of 10-20 nm. The plant has at least a 40% increase in leaf size compared to a plant under the same conditions but without applying the composition.

9 Claims, 19 Drawing Sheets

MANGANESE ZINC SPINEL FERRITE (Mn$_{0.5}$Zn$_{0.5}$Fe$_2$O$_4$) NANOPARTICLES FOR THE GROWTH PROMOTION OF PLANTS

STATEMENT OF PRIOR DISCLOSURE BY INVENTOR

Aspects of the present disclosure are described in H. Tombuloglu, M. Alsaeed, Y. Slimani, A. Demir-Korkmaz, G. Tombuloglu, H. Sozeri, M. A. Almessiere, A. Baykal, T. S. Kayed, and I. Ercan. "Formulation of Manganese Zinc Spinel Ferrite (Mn$_{0.5}$Zn$_{0.5}$Fe$_2$O$_4$) Nanoparticles for the Growth Promotion of Plants"; Journal of Soil Science and Plant Nutrition; May 10, 2023; 23, 3561, incorporated herein by reference in its entirety.

STATEMENT OF ACKNOWLEDGEMENT

The support of the Deputyship for Research & Innovation, Ministry of Education in Saudi Arabia for funding this research work under project number 2020-166-IRMC is gratefully acknowledged.

BACKGROUND

Technical Field

The present disclosure is directed to a fertilizer composition, particularly, to a fertilizer composition including a composite of manganese zinc spinel ferrite (Mn$_{0.5}$Zn$_{0.5}$Fe$_2$O$_4$) nanoparticles for the growth promotion of plants, and a method of using the fertilizer composition to fertilize a plant.

Description of the Related Prior Art

The description of the related prior art provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present invention.

Nanosized materials are used in a variety of fields, such as electronics, communications, biomedicine, agriculture and environmental remediation. In agricultural practices, nanotechnology and nano-enabled fertilizers are promising agents to replace traditional fertilizers, which cause eutrophication and groundwater contamination when widely applied on the ground surface.

Increases in human populations necessitates agricultural solutions with lower environmental impact.

Micronutrient deficiency in soil is a worldwide problem that reduces the growth performance of plants and leads to yield losses. Manganese (Mn), zinc (Zn), and iron (Fe) are the three essential micronutrients for plant growth and development. Up to a certain concentration, Mn, Zn, or Fe nanoparticles (NPs), as well as ZnO, Au, and TiO$_2$ NPs, can act as micronutrient sources. Further research is required to determine the incorporation of NPs into the plant body (especially crops) as well as translocation and even biomineralization. The production of novel NPs containing microelements for plant nutrition is a promising approach to compensate for the missing microelements.

Although numerous fertilizer compositions have been developed in the past, there still exists a need to develop fertilizer compositions that impart improved plant growth at low concentrations with low or no toxicity. It is one object of the present disclosure to provide a method of fertilizing a plant with a fertilizer composition including Mn, Fe, and Zn.

SUMMARY

In an exemplary embodiment, a method of fertilizing a plant is described. The method includes applying a composition to a root of the plant. The composition includes a spinel ferrite with a formula of Mn$_x$Zn$_y$Fe$_2$O$_4$, wherein x+y=1, wherein particles of the spinel ferrite are spherical and have an average diameter of 10-20 nanometers (nm).

In some embodiments, the spinel ferrite has a cubic crystal system.

In some embodiments, the particles of the spinel ferrite form an interconnected network.

In some embodiments, the method of applying the composition to the root of the plant comprises at least partially submerging the root of the plant in a fertilizer solution comprising the composition.

In some embodiments, the fertilizer solution is continuously pumped with air during applying the composition to the root of the plant.

In some embodiments, the fertilizer solution comprises 1-500 mg L$^{-1}$ of the particles of the spinel ferrite.

In some embodiments, the fertilizer solution further comprises at least one compound selected from the group consisting of potassium nitrate, calcium nitrate, magnesium sulfate, potassium dihydrogen phosphate, ammonium dihydrogen phosphate, manganese chloride, zinc sulfate, copper sulfate, molybdic acid, sodium molybdate, ferric tartrate, iron (III)-EDTA, and hydrates thereof.

In some embodiments, the plant is under conditions of 22-25° C., 55-70% humidity, and 14-18 hours of light per day.

In an exemplary embodiment, a method of making spinel ferrite is described. The method includes mixing an iron salt, a zinc salt, and a manganese salt in water to form a mixture; adjusting a pH of the mixture to 10-12 to form a reaction mixture; and sonicating the reaction mixture for 30-120 minutes to form the spinel ferrite.

In some embodiments, the method includes sonicating at a frequency of about 20 kilohertz (kHz) and a power of 60-80 Watt (W).

In an embodiment, the plant has at least a 40% increase in leaf size compared to a plant under the same conditions but without applying the composition.

In some embodiments, the plant uptakes the particles of the spinel ferrite, and wherein a root of the plant has a saturation magnetization value of 0.4-2 electromagnetic unit (emu)/gram (g) after 7 days in a solution comprising the composition.

In some embodiments, the plant uptakes the particles of the spinel ferrite, and wherein a stem of the plant has a saturation magnetization value of 0.3-1 emu/g after 7 days in a solution comprising the composition.

In some embodiments, the plant uptakes the particles of the spinel ferrite, and wherein a leaf of the plant has a saturation magnetization value of 0.2-0.7 emu/g after 7 days in a solution comprising the composition.

In some embodiments, the plant is a pumpkin.

In some embodiments, the plant is a *Cucurbita maxima* pumpkin.

In some embodiments, the composition further comprises a pesticide.

In some embodiments, the pesticide is attached to a surface of the particles of the spinel ferrite.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
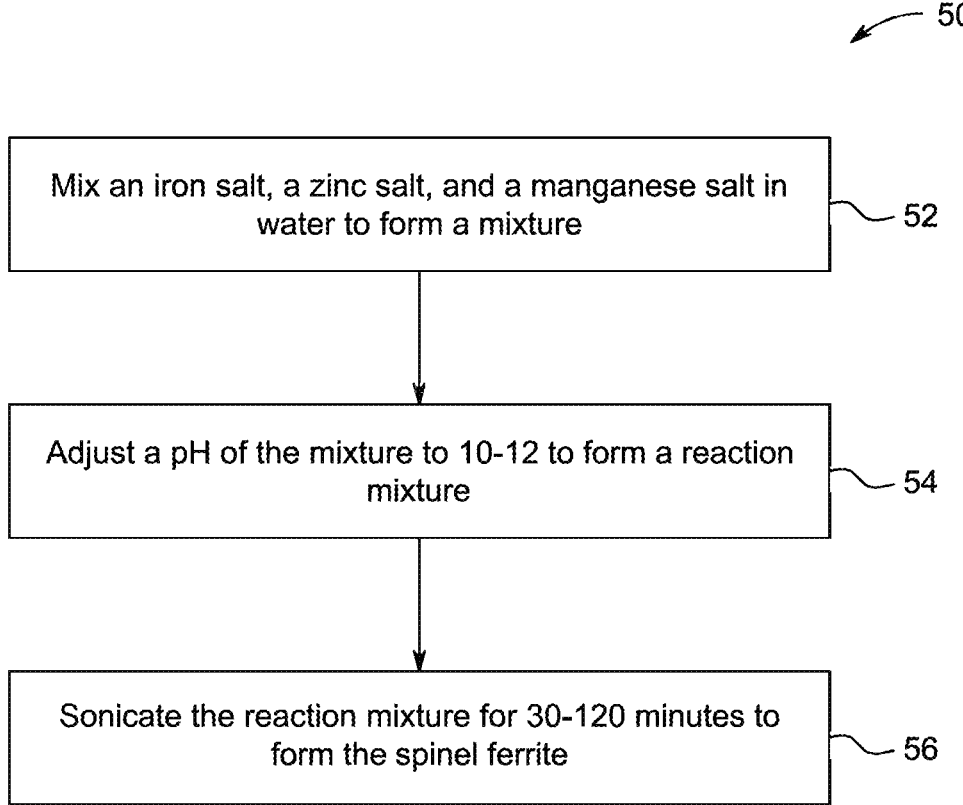
FIG. 1 is a flow chart depicting a method of making spinel ferrite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views.

Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

Where a numerical limit or range is stated herein, the endpoints are included. Also, all values and subranges within a numerical limit or range are specifically included as if explicitly written out.

Aspects of the present disclosure are directed to the uptake and potential contribution of engineered MnZn spinel ferrite nanoparticles (NPs) on the growth performance of plants by providing essential micronutrients, manganese (Mn), zinc (Zn), and iron (Fe). Treatment of the plants with the NPs resulted in an enhancement of phenological parameters such as pigmentation, photosynthetic efficiency, and biomass.

A method of fertilizing a plant is described. In some embodiments, the plant is any crop such as but not limited to rice, wheat, oats, millets, fruits, and vegetables. In an embodiment, the plant belongs to the Curcubitaceae family. The Cucurbitaceae family encompasses over 800 species of plants. These include cucumbers, melons, watermelons, pumpkins, squash, and many others. In some embodiments, the plant is a pumpkin. Suitable examples of pumpkin plants include *Cucurbita argyrosperma, C. ficifolia, C. maxima, C. moschata*, and *C. pepo*. In a preferred embodiment, the plant is a *Cucurbita maxima* pumpkin.

The method includes applying a composition to a root of the plant. The composition may be applied to a whole root or at least a part of a root of the plant. In some embodiments, the fertilizer solution may be sprayed on at least a part or a whole root of the plant. In some embodiments, the fertilizer solution may be dried and can be applied in the form of a powder. The powder may be carefully applied to at least a part or preferably the whole root of the plant. In some embodiments, the composition may be applied to other plant parts as well, such as leaf, stem, fruit, root, or any other part thereof, alone or in combination.

In preferred embodiments, the composition is applied to the plant by submerging at least a part of the root, preferably the whole root, of the plant, in a fertilizer solution including the composition. In a preferred embodiment, the fertilizer solution includes the composition suspended in a liquid. In some embodiments, the liquid is such as but not limited to water, and saline. In some embodiments, the fertilizer solution may include sources for other micronutrients and/or macronutrients. As used herein, "micronutrients" refers to elements 'required in small or trace amounts for plant growth, for example, molybdenum, nickel, copper, zinc, manganese, boron, iron, and chloride. As used herein, "macronutrients" refers to elements typically required in large amounts for plant growth, for example, sulfur, phosphorus, phosphate, magnesium, calcium, potassium, nitrogen, oxygen, carbon, and hydrogen. In some embodiments, the fertilizer solution further comprises at least one compound selected from the group consisting of potassium nitrate, calcium nitrate, magnesium sulfate, potassium dihydrogen phosphate, ammonium dihydrogen phosphate, manganese chloride, zinc sulfate, copper sulfate, molybdic acid, sodium molybdate, ferric tartrate, iron (III)-EDTA, and hydrates thereof. In some embodiments, the liquid is Hoagland solution. As would be known to one of ordinary skill in the art, Hoagland solution is intended to mimic nutrient rich soil. In a preferred embodiment, the plant is grown hydroponically, i.e. without soil.

In some embodiments, the concentration of the composition in the fertilizer solution is in a range of 1-500 mg $L^{-1}$ preferably 50-400 mg $L^{-1}$ preferably 100-400 mg $L^{-1}$, preferably 100-200 mg $L^{-1}$. On application of the fertilizer solution to the root of the plant, the plant uptakes the composition and it is translocated to other parts of the plant, such as leaves.

In an embodiment, the composition is applied for 1-100 days, preferably 2-90 days, 3-80 days, 5-70 days, 6-60 days, 7-50 days, 8-40 days, 9-30 days, or about 10-20 days. In some embodiments, the fertilizer solution is continuously pumped with air during the application process. This is done to prevent agglomeration of the particles in the fertilizer solution.

In some embodiments, during application, the plant is under conditions of 20-35° C., preferably 21-33° C., preferably 22-30° C., preferably 22-25° C. In some embodiments, during application, the plant is under conditions of 20-90% humidity, preferably 30-80%, 40-70%, 50-60%, or about 55% humidity. In some embodiments, during application, the plant is under conditions of 8-20 hours of light per day, preferably 10-18, 12-16, or about 14 hours of light per day.

In some embodiments, the composition includes a spinel ferrite. Spinel ferrites are preferably iron oxide ($Fe_3O_4$) nanoparticles. They are well-known in the art and can be obtained by various methods, see for example U.S. Pat. Nos. 9,161,996 and 8,962,031—both incorporated herein by reference in their entirety, and Szpak et al. ["Stable aqueous dispersion of supermagnetic iron oxide nanoparticles protected by charged chitosan derivatives" J. Nanopart. Res (2013) 15 (1), 1372—incorporated herein by reference in its entirety]. In some embodiments, the spinel ferrites are co-doped and have a magnetic ferrite of formula $MFe_2O_4$ where M is at least one transition metal selected from the group consisting of Zn, Cu, Ni, Co, and Mn. In some embodiments, the spinel ferrite has a formula of $Mn_xZn_yFe_2O_4$, wherein x+y=1. In a preferred embodiment, both x and y are greater than 0. In some embodiments, x equals 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95. In some embodiments, the spinel ferrite has a formula of $Mn_{0.25}Zn_{0.75}Fe_2O_4$. $Mn_{0.5}Zn_{0.5}Fe_2O_4$. $Mn_{0.2}Zn_{0.8}Fe_2O_4$, or combinations thereof. In some embodiments, the stochiometric amounts of the Mn and Zn elements in the Mn Zn, $Fe_2O_4$ may vary and can include all stochiometric amounts possible, provided that x+y=1. In a preferred embodiment, the composition includes particles of $Mn_{0.5}Zn_{0.5}Fe_2O_4$.

In general, the spinel ferrite can be any shape known to one of ordinary skill in the art. Examples of suitable shapes the spinel ferrite may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the spinel ferrite are spherical and have an average diameter in the range of 1 to 100 nm, preferably in the range of 10 to 90 nm, 10 to 80 nm, 10 to 70 nm, 10 to 60 nm, or about 10-20 nm. In some embodiments, the particles of the spinel ferrite are spherical and have an average diameter of 10-20 nm, preferably 12-19 nm, preferably 13-17 nm, preferably 14-16 nm, preferably 14 nm. In a preferred embodiment, the particles of spinel ferrite are less than 20 nm in size to facilitate uptake into the plant tissue. The particles of spinel ferrite are aggregated, forming an interconnected network. In other words, there are no lone spinel ferrite particles which are not touching at least one other spinel ferrite particle in the aggregated network. In some embodiments, the interconnected network is a chain of the spinel ferrite particles with a width of 100-200 nm, preferably 110-190 nm, 120-180 nm, 130-170 nm, 140-160 nm, or about 150 nm, and a length of at least 1 μm, preferably 1-10 μm, 2-9 μm, 3-8 μm, 4-7 μm, or 5-6 μm. In some embodiments, the spinel ferrite has a triclinic, monoclinic, orthorhombic, tetragonal, trigonal, hexagonal, or cubic crystal system. In a preferred embodiment, the spinel ferrite has a cubic crystal system.

FIG. 1 illustrates a flow chart of method 50 of preparing from the mixture. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing an iron salt, a zinc salt, and a manganese salt in water to form a mixture. In some embodiments, the iron salt is selected from iron (III) chloride, iron (III) nitrate, iron (III) sulfate and hydrates thereof. In a preferred embodiment, the iron salt is iron (III) nitrate nonahydrate, $(Fe(NO_3)_3 \cdot 9H_2O)$. In some embodiments, the zinc salt is selected from zinc chloride, zinc nitrate, zinc sulfate and hydrates thereof. In a preferred embodiment, the zinc salt is zinc nitrate hexahydrate, $(Zn(NO_3)_2 \cdot 6H_2O)$. In some embodiments, the manganese salt is selected from manganese (II) chloride, manganese (II) nitrate, manganese (II) sulfate and hydrates thereof. In a preferred embodiment, the manganese salt is manganese nitrate hexahydrate. In an embodiment, the molar ratio of the iron salt to the zinc salt is in a ratio range of 1:1 to 1:10. In some embodiments, the molar ratio of the iron salt to the manganese salt is 1:1 to 10:1, preferably 2:1 to 9:1, preferably 3:1 to 8:1, preferably 4:1 to 5:1, preferably 4:1. In some embodiments, the molar ratio of the zinc salt to the manganese salt is 1:1 to 10:1, preferably 2:1 to 9:1, preferably 3:1 to 8:1, preferably 4:1 to 5:1, preferably 4:1. The salts are dissolved in water to form the mixture.

At step 54, the method 50 includes adjusting a pH of the mixture to 10-12 to form a reaction mixture. The pH can be adjusted using a base, preferably NaOH, or any other base that is known in the art.

At step 56, the method 50 includes sonicating the reaction mixture for 30-120 minutes to form the spinel ferrite. The sonication is at a frequency of about 20 kHz and a power of 60-80 W, preferably 65-75 W or about 70 W. In an embodiment, the reaction mixture is sonicated for 40-80 minutes, preferably 60 minutes to form the spinel ferrite.

Following applying the composition, in some embodiments, the plant uptakes the particles of the spinel ferrite, and wherein a root of the plant has a saturation magnetization value of 0.4-2 electromagnetic unit (emu)/gram (g), preferably 0.7-1.7, 1-1.5 or about 1.2 emu/g after 7 days in a solution comprising the composition. In some embodiments, the plant uptakes the particles of the spinel ferrite, and wherein a stem of the plant has a saturation magnetization value of 0.3-1 emu/g, preferably 0.4-0.7 emu/g, or 0.5-0.6 emu/g after 7 days in a solution comprising the composition. In some embodiments, the plant uptakes the particles of the spinel ferrite, and wherein a leaf of the plant has a saturation magnetization value of 0.2-0.7 emu/g, preferably 0.3-0.6, or 0.4-0.5 emu/g after 7 days in a solution comprising the composition.

This indicates that the plant uptakes the magnetic spinel ferrite particles following the application to the roots. The amount of spinel ferrite particles translocated from the roots up to the stem into the leaves gradually decreases, as shown by the decreasing saturation magnetization values due to biological barriers such as cell wall, cell membrane, sieve elements, sieve plates, constituting the stem part of the plant. While not wishing to be bound to a single theory, it is thought that the small size of the spinel ferrite NPs plays a role in their translocation to different plant tissues. In other words, the smaller the size of the NPs, the higher the plant uptake and translocation to various tissues.

Upon applying the fertilizer composition, the plant has at least a 40% increase in leaf size, preferably 50%, 60%, 70%, 80%, 90%, or 100% increase compared to a plant under the same conditions but without applying the composition. This indicates that MnZn spinel ferrite improves the photosynthetic pigments in the plants, due to the translocation of Mn, Zn, and Fe into the leaves, where they can be incorporated into the biochemical reactions as co-factors or structural elements.

Because the plants translocate the spinel ferrites from the roots to the leaves, other components can be added to provide further benefits to the plant. In some embodiments, the composition further comprises a pesticide. Suitable examples of pesticides include, but are not limited to, abamectin, acephate, acetamiprid, allethrin, arsenic trioxide, azadirachtin, bifenthrin, borate, canola oil, carbaryl, chlorantraniliprole, clothianidin, cryolite, cyfluthrin, cypermethrin, diflubenzuron, dinotefuran, disulfoton, emamectin benzoate, fipronil, fluvalinate, *Heterorhabditis* spp. nematodes, horticultural oil, hydramethylnon, imidacloprid, jojoba oil, lambda-cyhalothrin, malathion, neem oil, *Nosema locustae*, permethrin, pyrethrin, resmethrin, rotenone, silica gel, soap, spinosad, *Steinernema* spp. nematodes, sulfluramid, thiamethoxam, 2,4-D, benefin, bensulide, bentazon, bromoxynil, cacodylic acid, calcium acid methanearsonate, carfentrazone, chlorsulfuron, clethodim, DCPA, dicamba, dichlobenil, dimethenamid-P, diquat, dithiopyr, EPTC, fluazifop, fluroxypyr foramsulfuron, glufosinate, glyphosate, halosulfuron, hexazinone, imazapyr, isoxaben, MCPA, mecoprop, metolachlor, MSMA, napropamide, oryzalin, oxadiazon, oxyfluorfen, pelargonic acid, pendimethalin, prodiamine, pronamide, quinclorac, sethoxydim, siduron, sulfosulfuron, tebuthiuron, triclopyr, trifloxysulfuron-sodium, trifluralin, bordeaux mixture, calcium polysulfide, chlorothalonil, copper ammonium complex, copper hydroxide, copper octanoate, copper oxychloride sulfate, cupric hydroxide, fosetyl-al, horticultural oil, jojoba oil, mancozeb, myclobutanil, neem oil, phosphorous acid, potassium bicarbonate, resmethrin, soap, sulfur, thiophanate methyl, tribasic copper sulfate, triforine, ferric sodium EDTA, iron phosphate, metaldehyde, and/or combinations thereof.

In some embodiments, the pesticide is attached to a surface of the particles of the spinel ferrite. In some embodiments, the attachment occurs through a functionalized coating on a surface of the spinel ferrite. In some embodiments, the attachment is through a chemical covalent bond or through physical attractive forces, such as van der Waals forces, hydrogen bonding, and/or hydrophobic interactions.

In some embodiments, the coating is a hydrophilic or hydrophobic coating. Examples of a hydrophilic coatings include, glycols, alcohols, sulfates, sulfonates, carboxylates, and phosphates. Examples of hydrophobic coatings include, compounds with extended carbon chains such as a carbon chain having up to 30 carbon atoms, preferably 5-25 carbons, 10-20 carbons or about 15 carbons. Certain other examples for coatings include dextran, polyvinyl alcohol, Tween80®, gold nanocages, chitosan, fluorinated chains and/or mixtures thereof. The choice of the coating material is dependent on the pesticide that is to be applied.

EXAMPLES

The following examples demonstrate the effect of manganese zinc spinel ferrite ($Mn_{0.5}Zn_{0.5}Fe_2O_4$) nanoparticles on the growth promotion of a pumpkin plant as described herein. The examples are provided solely for illustration and are not to be construed as limitations of the present disclosure, as many variations thereof are possible without departing from the spirit and scope of the present disclosure.

Example 1: Synthesis of Nanoparticles

The $Mn_{0.5}Zn_{0.5}Fe_2O_4$ NPs were synthesized by a sonochemical approach. All chemicals were obtained from commercial sources (Merck). For the typical synthesis, iron (III) nitrate nonahydrate; $Fe(NO_3)_3 \cdot 9H_2O$, zinc nitrate hexahydrate; $(Zn(NO_3)_2 \cdot 6H_2O)$, manganese nitrate hexahydrate; $(Mn(NO_3)_2 \cdot 6H_2O)$ were used as source material for Fe, Zn, and Mn respectively. The stoichiometric amounts of Mn, Zn, and Fe nitrates were dissolved in 35 mL of deionized (DI) water. Then, the pH of the mixed solution was adjusted to 11 using a 2 M NaOH solution. Finally, the solution was exposed to high-intensity ultrasonic irradiation (Ultrasonic homogenizer UZ SONOPULS HD 2070; frequency: 20 kHz and power: 70 W) for 60 min. At the end of the ultrasonication, the reaction temperature was measured as 90° C. due to many collisions between the reactants. The received product was washed several times with DI water. The magnetic solid product was separated from the liquid by a simple external magnet. It was dried at 60° C. for 12 h. The $Mn_{0.5}Zn_{0.5}Fe_2O_4$ NPs are also referred to throughout as the NPs.

Example 2: Structural and Morphological Analysis Techniques

The structural analysis was conducted by a Rigaku Benchtop Miniflex X-ray diffraction (XRD, $CuK_\alpha$ radiation) (Rigaku, Japan). A transmission electron microscope (TEM) investigated the composites' morphology (FEI, Morgagni 268). The selected area (electron) diffraction (SAED) pattern was also monitored.

Example 3: Plant Growth and Nanoparticle Treatment Methods

Pumpkin (*Cucurbita maxima* L.) seeds (n=10) were germinated in Petri plates between two layers of moist tissue paper in the dark. When the stem reached about five cm in length, they were transferred into bottles filled with Hoagland solution [Hoagland D R, Arnon D I (1950), The water-culture method for growing plants without soil, Circular. California Agricultural Experiment Station 347 (2nd edit)]. After three days of acclimatization, the solution was changed with Hoagland+NPs suspension. In brief, the suspension was prepared to contain 50, 100, 200, and 400 mg $L^{-1}$ of NPs, and then they were sonicated in a sonic water bath (Powersonic 410, Hwashin Technology, Korea) for 30 minutes. The suspension was continuously aerated with the help of an air pump to minimize NPs agglomeration. The suspension lacking NPs was used as the control. The seedlings were grown under greenhouse conditions (22-25° C. temperature, 55-70% humidity, and 16/8 h light/dark photoperiod) for one week.

Example 4: Vibrating Sample Magnetometer Analysis

The stem and leaf tissues of pumpkin seedlings (n=5) were harvested after one week of NP treatment. The tissues were dried in an oven (70° C.) for five days and then crushed in a ceramic mortar with a pestle. The fine powder of the tissues was used for the analyses. The magnetic measurements were conducted using a Superconducting Quantum Interference Device with Vibrating Sample Magnetometer (SQUAD-VSM) instrument with a limit of detection (LoD) of ~0.5 ρemu.

Example 5: X-Ray Fluorescence (XRF) Analysis

The elemental analysis was performed using a 4 kW Rigaku Primus II Wavelength Dispersive X-ray fluorescence (WDXRF). Measurements can cover elements from Be to U92. The system has two different types of detectors, namely Scintillation Counter (SC) and Flow Proportional Counter (F-PC). In addition, ten different internal crystals with an automatic crystal exchanger were used to detect the elements in each sample. A sample holder having a window of 30 mm diameter was used, and the measurements were done in a vacuum environment. The dry fine powders of the root, shoot, and leaf tissues were placed into the sample holders and analyzed.

Example 6: Determination of Pigments and Photosynthetic Parameters

The pumpkin seedlings (n=4) were grown in a hydroponic system for a week. The photosynthetic pigments (chlorophyll a, chlorophyll b, and carotenoids) were determined accordingly. In brief, 50 mg of fresh leaf samples were homogenized with 4 mL of 80% (v/v) acetone. After centrifugation (4000×g for 15 min), the supernatant was collected, and the absorbance at 663, 646, and 470 nm was measured (Biotek, Synergy Neo2). The equations below were used to quantify chlorophyll a, chlorophyll b, and carotenoid contents:

$$Chl_a = 12.21 \times A_{663} - 2.81 \times A_{646}$$

$$Chl_b = 20.13 \times A_{646} - 5.03 \times A_{663}$$

$$Car = (1000 \times A_{470} - 3.27 \times Chl_a - 104 \times Chl_b) \div 227$$

Chlorophyll fluorescence in NPs-treated (50, 100, 200, and 400 mg/L) and control leaves of pumpkin (n=3) was determined by using a Junior-PAM modulated fluorometer (Walz® GmbH, Effeltrich, Germany). Before the measurements, the one-week-old seedlings were dark-adapted for 30 minutes at ambient temperature. An actinic pulse light with an intensity of 150 mmol $m^{-2}$ $s^{-1}$ was exposed to the leaves, and the photosynthetic parameters were measured using WinControl-3.29 software (Walz® GmbH, Effeltrich, Germany). The minimum fluorescence ($F_o$), maximum fluorescence ($F_m$), the effective photochemical quantum yield of photosystem II (Y (II)), and electron transport rate (ETR) were determined in NP-treated plants and compared with the control. The variable fluorescence ($F_v$) and maximum quantum efficiency of PSII (Fv/Fm) were also calculated according to Kitajima and Butler (1975).

Example 7: Statistical Analyses

To understand the significance level of the changes between the NP-treated and non-treated (control) tissues, t-test statistical analysis was used. The degree of significance was shown as an asterisk symbol (*P<0.05, P<0.01, *P<0.005).

Example 8: Structural and Morphological Characterization of the NPs

Figure 2A:
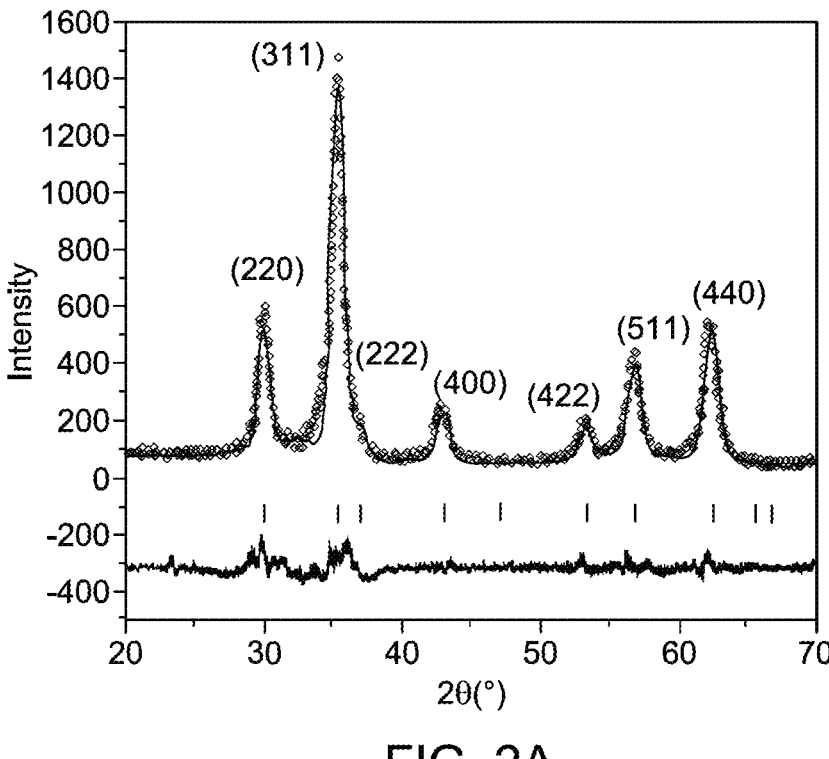
FIG. 2A is an X-ray diffractogram (XRD) image of $Mn_{0.5}Zn_{0.5}Fe_2O_4$ nanoparticles (NPs), according to certain embodiments.
Figure 2B:
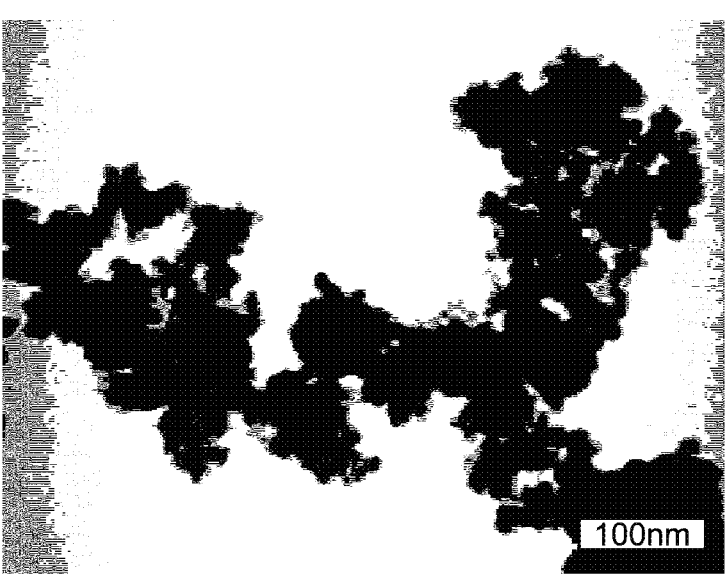
FIG. 2B is a transmission electron microscope (TEM) image of the $Mn_{0.5}Zn_{0.5}Fe_2O_4$ NPs, according to certain embodiments.
Figure 2C:
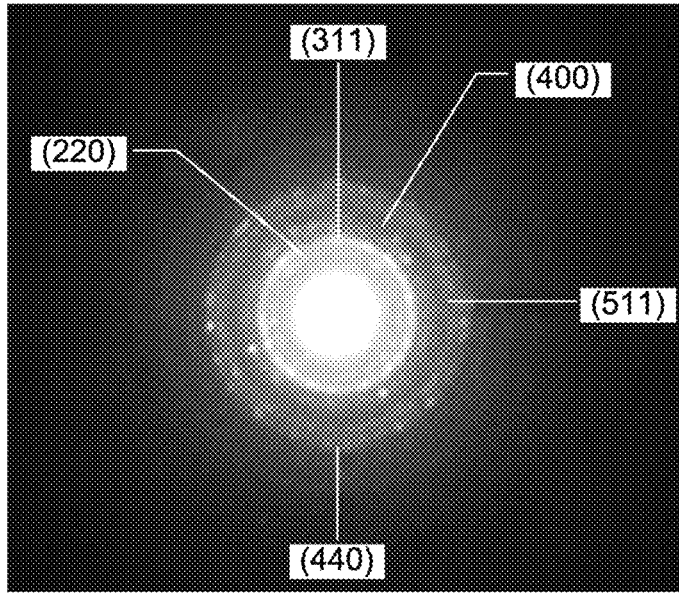
FIG. 2C is a selected area (electron) diffraction (SAED) pattern of the $Mn_{0.5}Zn_{0.5}Fe_2O_4$ NPs, according to certain embodiments.
Figure 2D:
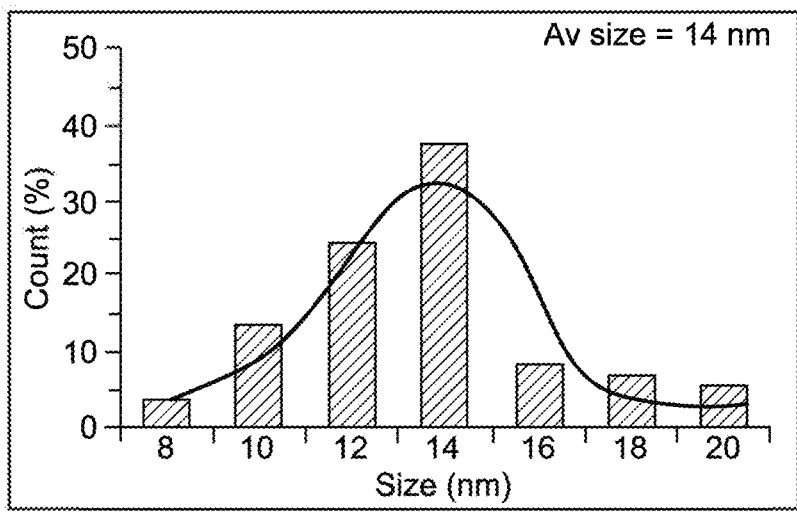
FIG. 2D depicts size distribution analyses of the $Mn_{0.5}Zn_{0.5}Fe_2O_4$ NPs, according to certain embodiments.

FIG. 2A presents the XRD powder pattern of $Mn_{0.5}Zn_{0.5}Fe_2O_4$ NPs. The XRD exhibited the peaks of spinel $Mn_{0.5}Zn_{0.5}Fe_2O_4$ NPs with the following hkl values of (220), (311), (222), (400), (422), (511), and (440). These findings approved the successful synthesis of cubic $Mn_{0.5}Zn_{0.5}Fe_2O_4$ NPs. The cell parameters and average crystallite size of the product were calculated via Match 3! and Fullproof software at 15.1 nm. The cubic morphology and the SAED pattern of the product were identified by TEM (FIG. 2B and FIG. 2C), and the particle size was estimated as 14 nm (FIG. 2D), which is consistent with the crystallite size obtained from the XRD pattern (FIG. 2A).

Example 9: Treatment of Plants with the NPs

The magnetization properties of the three dried tissues (root, stem, and leaf) of the plants grown in aqueous mediums containing different concentrations of $Mn_{0.5}Zn_{0.5}Fe_2O_4$ NPs are described herein. A vibrating sample magnetometer (VSM) head connected to the Physical Property Measurement System (PPMS) device was used to perform the magnetization measurements as a function of the magnetic field (M-H). This helps to investigate the uptake and transport of $Mn_{0.5}Zn_{0.5}Fe_2O_4$ NPs to the various tissues. M-H curves were measured at room temperature for the three dried parts of the plant (root, stem, and leaf) cultivated in the presence of various concentrations of $Mn_{0.5}Zn_{0.5}Fe_2O_4$ NPs (50, 100, 200, and 400 mg $L^{-1}$) and control (i.e., without NPs). The results of magnetization for each sample were divided by its mass. The strength of the magnetic response is proportionate to the concentration of magnetic nanomaterials. In other words, the higher the proportion of magnetic nanomaterials inside different plant tissues, the stronger the magnetic signal. Generally, several other factors can affect the magnetic features, such as the size of nanomaterials and the shape of nanostructured materials. Briefly, the saturation magnetization ($M_s$) is defined as the value where the magnetization reaches saturation level, the remanent magnetization ($M_r$) is the magnetization value after the removal of the external magnetic field, and the coercive field ($H_c$) is described as the field required for obtaining zero-magnetization value.

Figure 3:
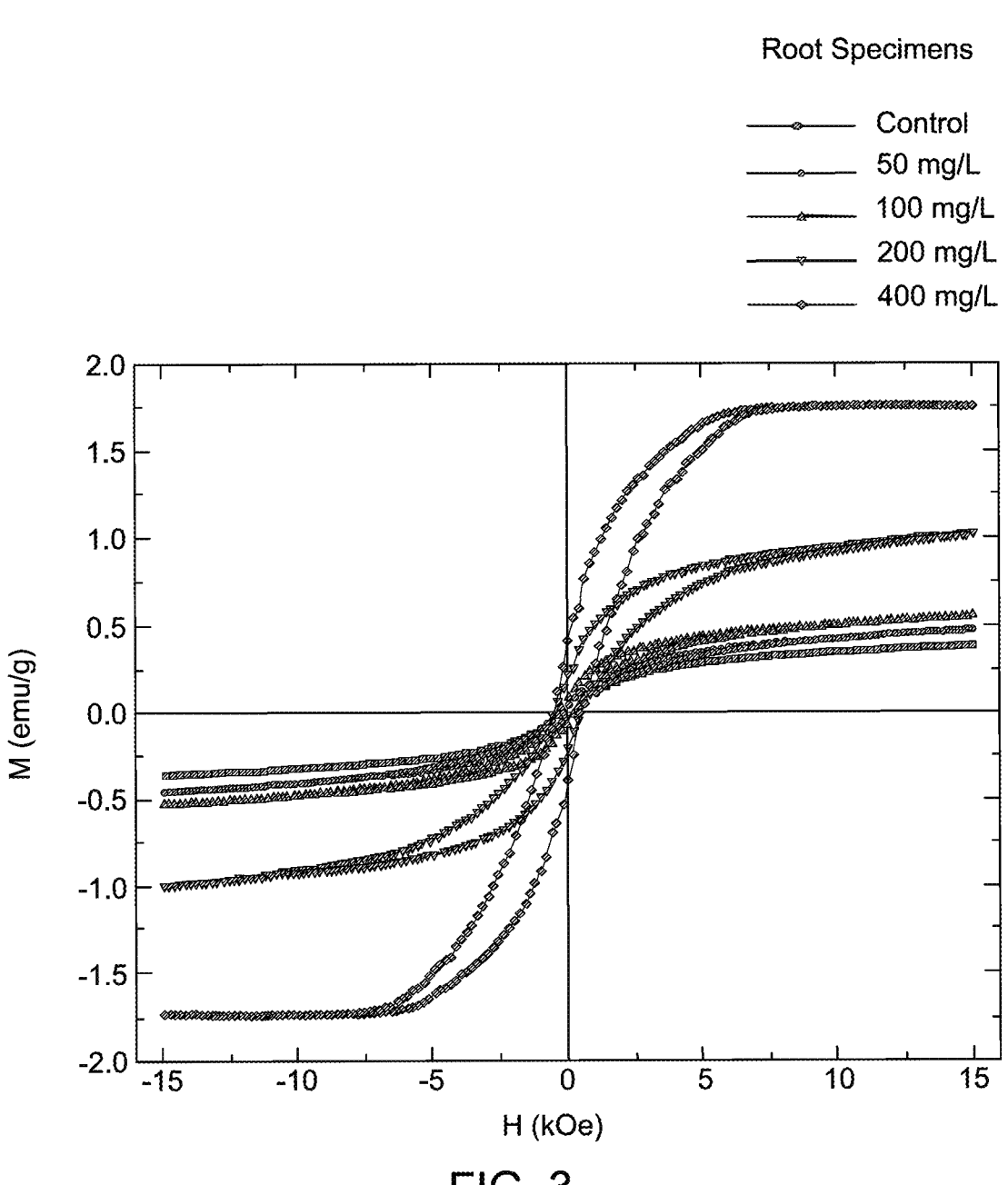
FIG. 3 shows M-H hysteresis loops of root samples taken from a plant cultivated in an aqueous medium containing different concentrations of the $Mn_{0.5}Zn_{0.5}Fe_2O_4$ NPs, according to certain embodiments.

Room temperature M-H curves of root specimens, as shown in FIG. 3, displayed low magnitudes of $M_s$, $M_r$, and $H_c$. The registered $M_s$ values for different root samples are in the range of 0.37-1.75 electromagnetic unit (emu)/gram (g). The determined $M_r$ values for various root samples were in the interval of 0.03-0.38 emu/g. A small hysteresis loop has been observed in various M-H curves near H=0 Oe. Indeed, the extracted $H_c$ values for different root samples ranged from 154-493 Oe. These results reflect the soft ferromagnetic features of different root samples cultivated in aqueous mediums containing different concentrations of $Mn_{0.5}Zn_{0.5}Fe_2O_4$ NPs. Usually, organic specimens exhibited low magnitudes of magnetic parameters. The magnitude of magnetization of root specimens increases with the concentration of $Mn_{0.5}Zn_{0.5}Fe_2O_4$ NPs compared to the control root sample.

Figure 4:
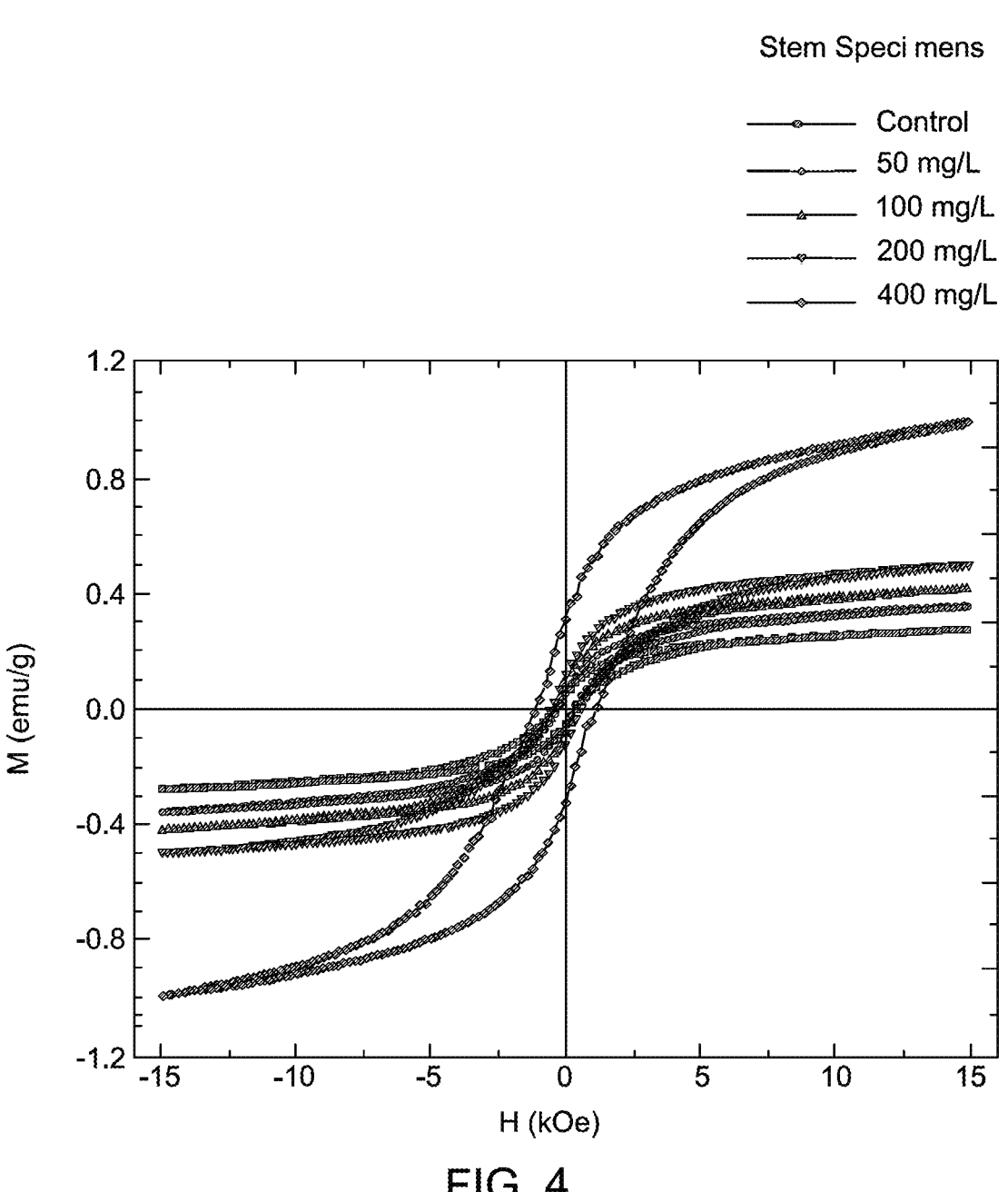
FIG. 4 shows M-H curves of stem samples taken from the plant grown in an aqueous medium containing different concentrations of the $Mn_{0.5}Zn_{0.5}Fe_2O_4$ NPs, according to certain embodiments.

As a second stage, the M-H measurements of stem tissues cultivated in different aqueous mediums containing diverse concentrations of the NPs were investigated. The M-H curves of stem parts of plants grown with the addition of different concentrations of NPs, 50 mg $L^{-1}$, 100 mg $L^{-1}$, 200 mg $L^{-1}$, and 400 mg $L^{-1}$, and control, are shown in FIG. 4. The various gathered stem specimens displayed low magnitudes of magnetic parameters. The observed $M_s$ values for different stem specimens are in the range of 0.27-0.99 emu/g. The extracted $M_r$ values for various stem specimens were in the interval of 0.04-0.30 emu/g. Except for the stem samples cultivated with the addition of 400 mg $L^{-1}$ of magnetic NPs ($H_c$=1106 Oe), the rest of the stem samples displayed $H_c$ values in the range of 254-524 Oe.

Figure 5:
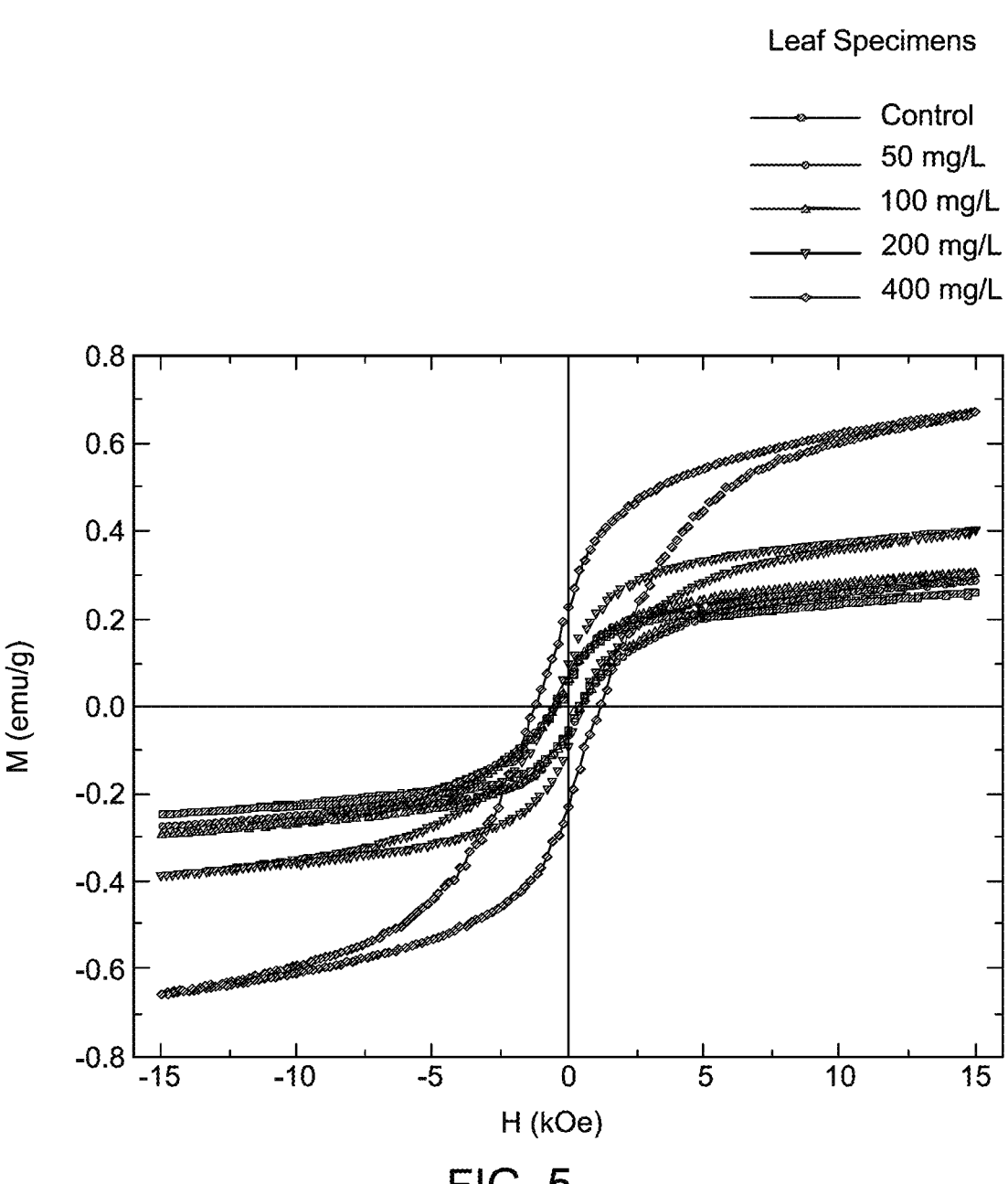
FIG. 5 shows M-H curves of leaf samples taken from the plant grown in an aqueous medium containing different concentrations of the $Mn_{0.5}Zn_{0.5}Fe_2O_4$ NPs, according to certain embodiments.
Figure 6A:
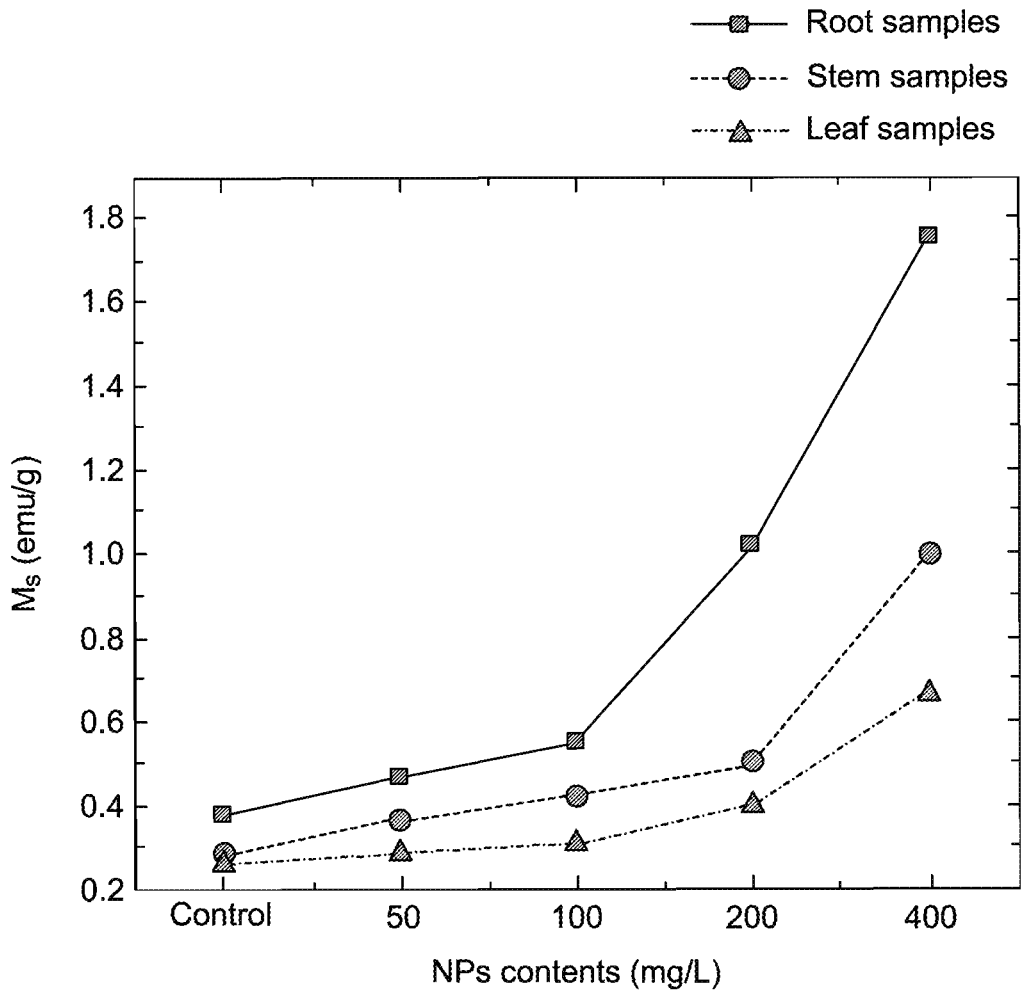
FIG. 6A shows variation in the values of saturation magnetization ($M_s$) with respect to different concentrations of the $Mn_{0.5}Zn_{0.5}Fe_2O_4$ NPs, according to certain embodiments.
Figure 6B:
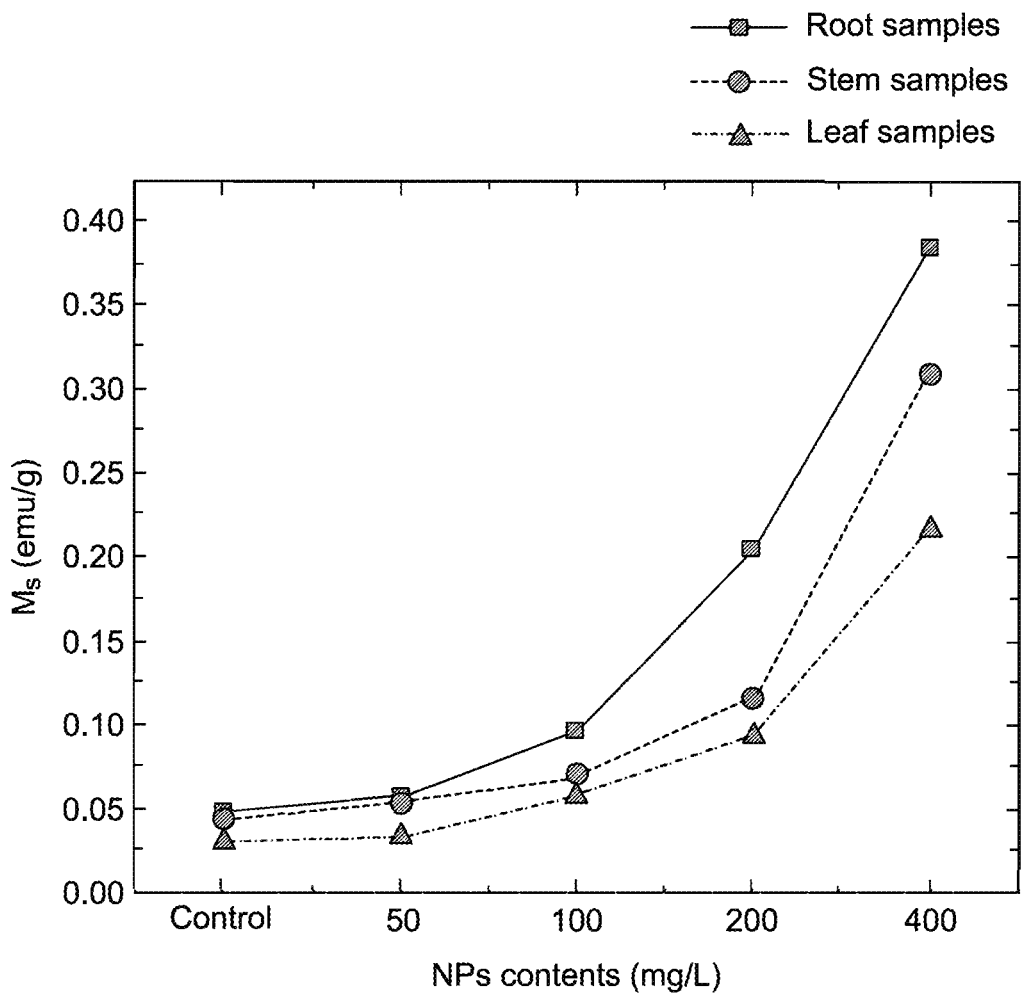
FIG. 6B shows variation in the values of $M_r$ remanent magnetization ($M_r$) with respect to different concentrations of the $Mn_{0.5}Zn_{0.5}Fe_2O_4$ NPs, according to certain embodiments.
Figure 6C:
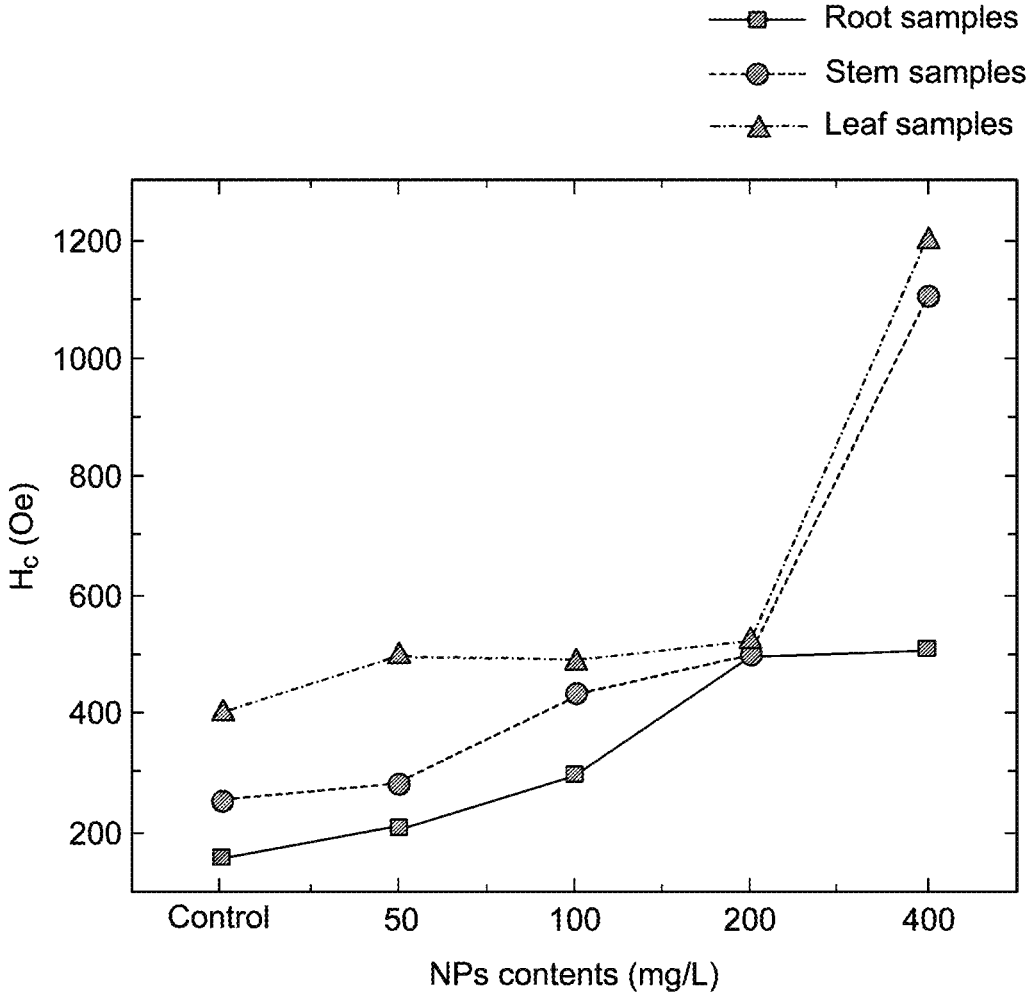
FIG. 6C shows variation in the values of coercive field ($H_c$) with respect to different concentrations of the $Mn_{0.5}Zn_{0.5}Fe_2O_4$ NPs, according to certain embodiments.

Finally, the M-H measurements of leaf tissues cultivated in different aqueous mediums containing diverse concentrations of NPs were explored. The results of this study are depicted in FIG. 5. The corresponding M-H curves are shown in FIG. 6A-6C. The different magnetic parameters were also extracted. It has also been found that the magnitudes of $M_s$ and $M_r$ values were very low. Indeed, the determined $M_s$ values for different leaf samples were in the interval of 0.0.25-0.66 emu/g (FIG. 6A). The gathered $M_r$ values for various leaf samples are in the interval of 0.04-0.21 emu/g (FIG. 6B). The $H_c$ values are slightly larger in comparison to those of root and leaf samples (FIG. 6C).

The collected $M_s$, $M_r$, and He values, which are extracted from different M-H curves, are summarized in FIGS. 6A-6C. The magnetic signal intensifies with increased concentration of added NPs in the aqueous medium. Indeed, the $M_s$ values increased from 0.37 emu/g for the control root sample to 0.46, 0.54, 1.01, and 1.75 emu/g for root samples cultivated in an aqueous medium containing magnetic NPs of concentrations of 50 mg $L^{-1}$, 100 mg $L^{-1}$, 200 mg $L^{-1}$, and 400 mg $L^{-1}$, respectively. For the case of stem tissue, $M_s$ values raised from 0.27 emu/g for control stem specimen to 0.36, 0.42, 0.50, 0.99 emu/g for those cultivated with the additions of 50 mg $L^{-1}$, 100 mg $L^{-1}$, 200 mg $L^{-1}$, and 400 mg $L^{-1}$ of NPs, respectively. The values of $M_s$ increased from 0.25 emu/g for leaf samples to 0.28, 0.30, 0.39, and 0.66 emu/g for leaf samples taken from plants grown with the additions of 50 mg $L^{-1}$, 100 mg $L^{-1}$, 200 mg $L^{-1}$, and 400 mg $L^{-1}$ of NPs, respectively.

Figure 7:
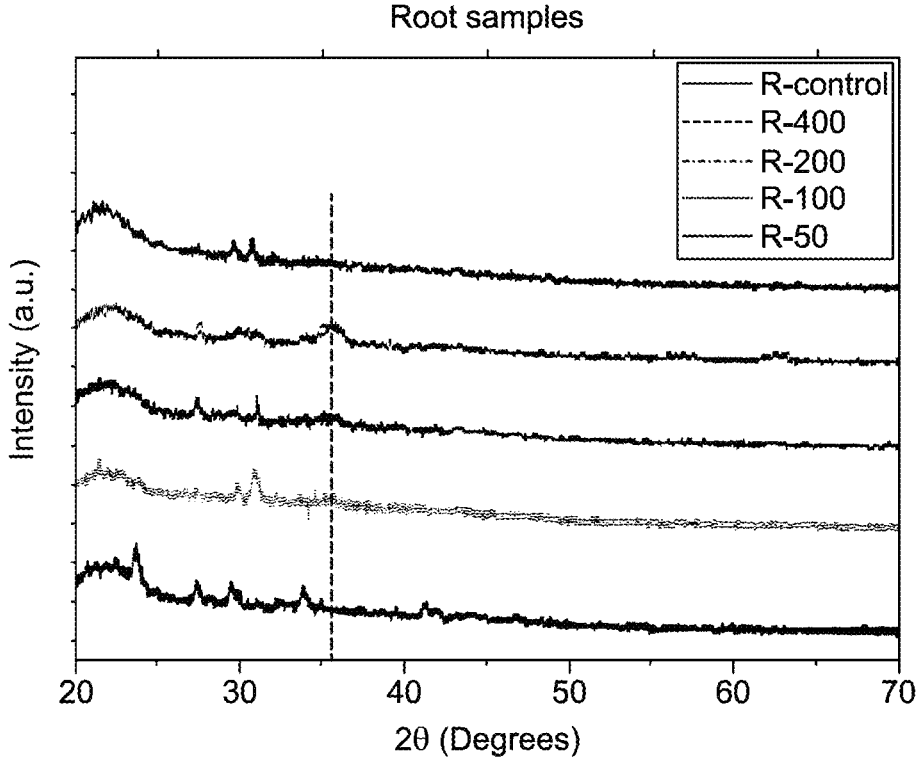
FIG. 7 shows XRD powder patterns of root parts of the plant upon treatment with various concentrations of the $Mn_{0.5}Zn_{0.5}Fe_2O_4$ NPs, according to certain embodiments.

The XRD powder patterns of the dried root, stem, and leaf samples of plants treated with 0 (control), 50, 100, 200, and 400 mg $L^{-1}$ of NPs are shown in FIG. 7. The results showed the absence of magnetic NPs in the 50 mg $L^{-1}$-treated root sample (R-50), which contains the least quantity of magnetic NPs compared to higher applied concentrations (i.e., 100-400 mg $L^{-1}$) (FIG. 7). The fingerprint of magnetic NPs appears in the root samples harvested from 100, 200, and 400 mg $L^{-1}$-treated plants (R-100, R-200, and R-400). The control sample does not show the characteristic XRD peaks of the applied NPs. However, XRD peaks of magnetic NPs in any samples of the stem and leaf were not observed. This may be related to the detection limit of the XRD instrument, which is higher than the concentration of magnetic NPs translocated to the tissues.

Figures 8A, 8B, 8C:
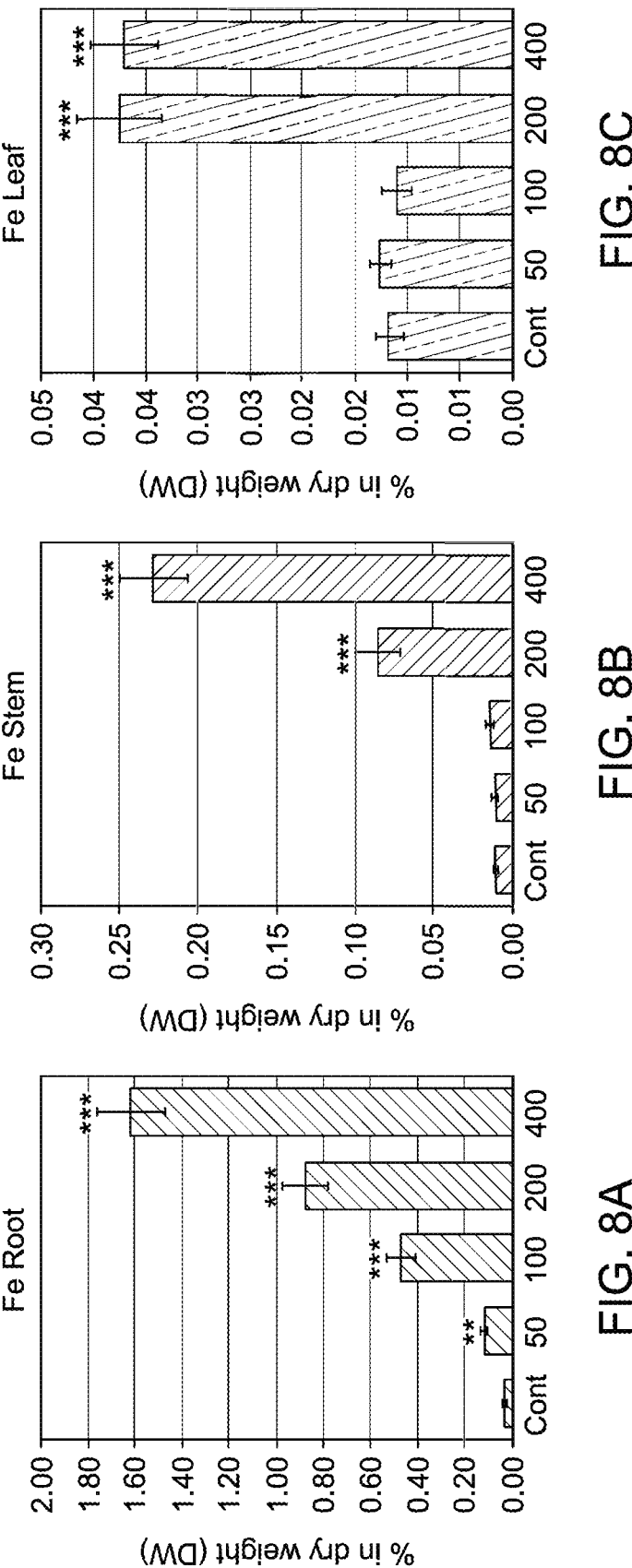
FIG. 8A shows the content of iron (Fe) in the root of the plant on treatment with various concentrations of the $Mn_{0.5}Zn_{0.5}Fe_2O_4$ NPs, according to certain embodiments.
FIG. 8B shows the content of Fe in the stem of the plant on treatment with various concentrations of the $Mn_{0.5}Zn_{0.5}Fe_2O_4$ NPs, according to certain embodiments.
FIG. 8C shows the content of Fe in the leaf of the plant on treatment with various concentrations of the $Mn_{0.5}Zn_{0.5}Fe_2O_4$ NPs, according to certain embodiments.
Figures 8D, 8E, 8F:
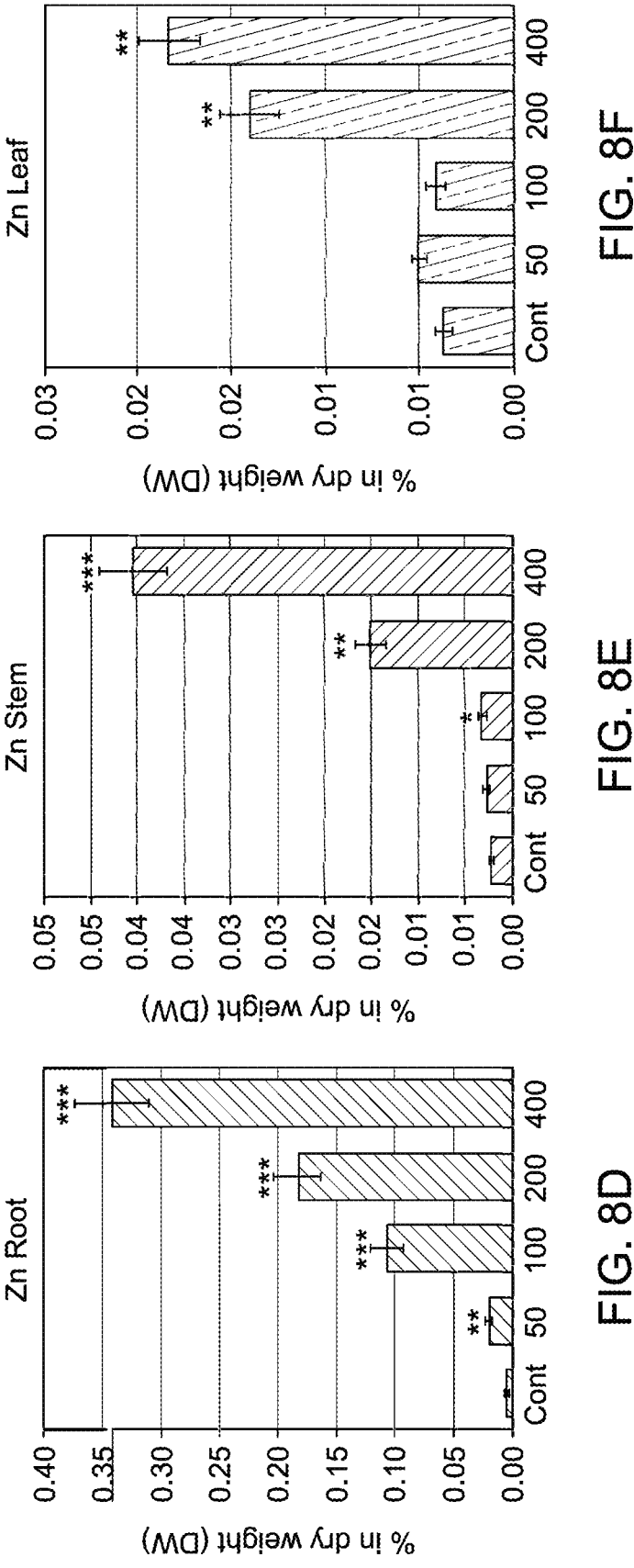
FIG. 8D shows the content of zinc (Zn) in the root of the plant on treatment with various concentrations of the $Mn_{0.5}Zn_{0.5}Fe_2O_4$ NPs, according to certain embodiments.
FIG. 8E shows the content of Zn in the stem of the plant on treatment with various concentrations of the $Mn_{0.5}Zn_{0.5}Fe_2O_4$ NPs, according to certain embodiments.
FIG. 8F shows the content of Zn in the leaf of the plant on treatment with various concentrations of the $Mn_{0.5}Zn_{0.5}Fe_2O_4$ NPs, according to certain embodiments.
Figures 8G, 8H, 8I:
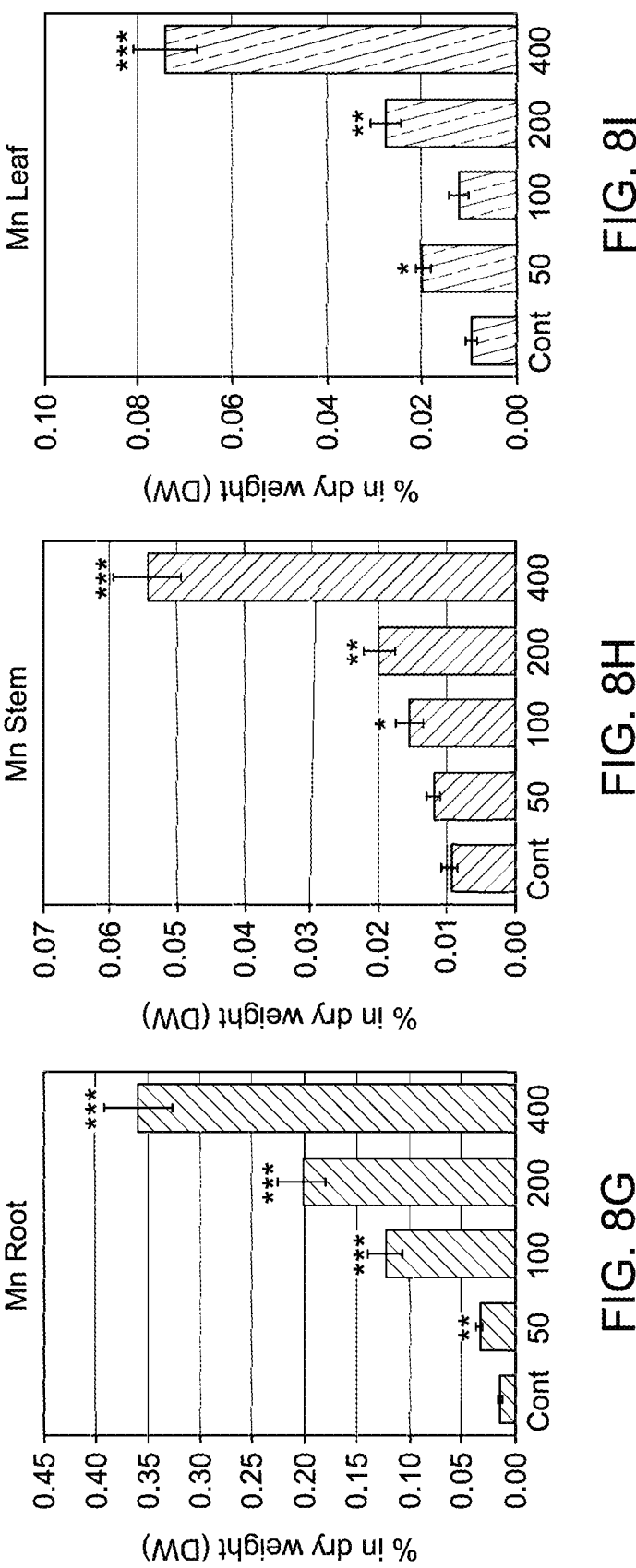
FIG. 8G shows the content of manganese (Mn) in the root of the plant on treatment with various concentrations of the $Mn_{0.5}Zn_{0.5}Fe_2O_4$ NPs, according to certain embodiments.
FIG. 8H shows the content of Mn in the stem of the plant on treatment with various concentrations of the $Mn_{0.5}Zn_{0.5}Fe_2O_4$ NPs, according to certain embodiments.
FIG. 8I shows the content of Mn in the leaf of the plant on treatment with various concentrations of the $Mn_{0.5}Zn_{0.5}Fe_2O_4$ NPs, according to certain embodiments.
Figure 8J:
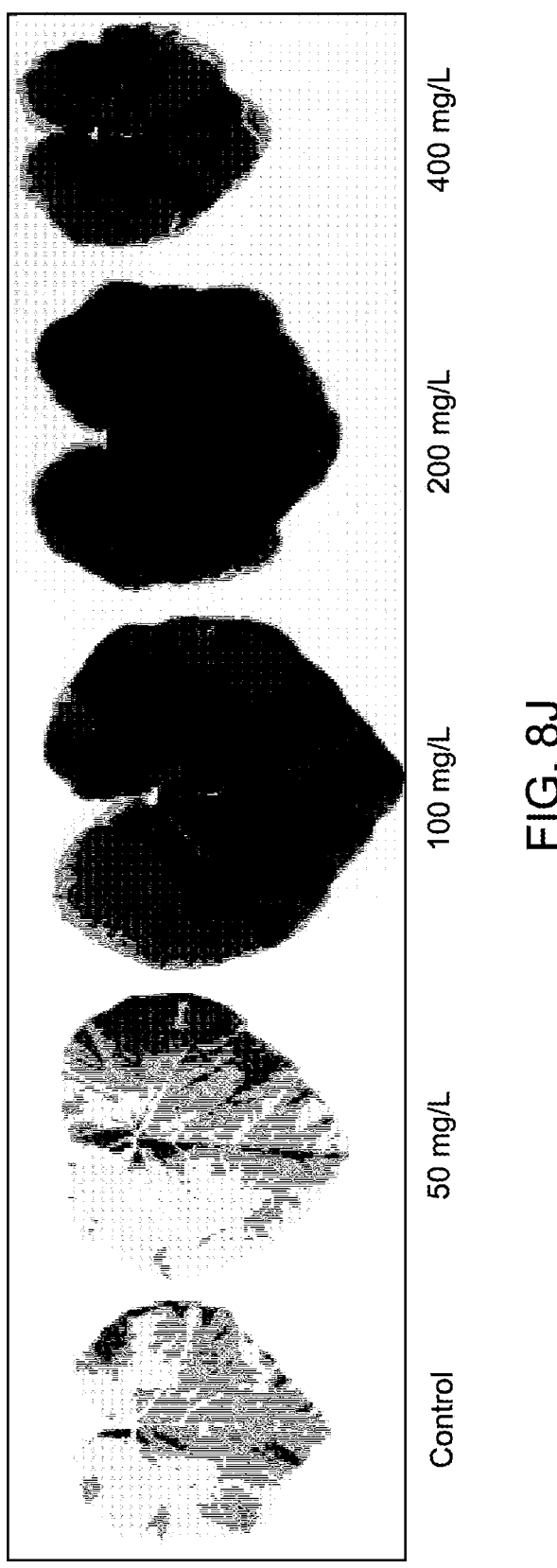
FIG. 8J depicts the effect of the concentration $Mn_{0.5}Zn_{0.5}Fe_2O_4$ NPs on leaf growth, according to certain embodiments.

The content of iron (Fe), zinc (Zn), and manganese (Mn) in the root, stem, and leaf of pumpkin upon treatment with diverse concentrations of $Mn_{0.5}Zn_{0.5}Fe_2O_4$ NP (control, 50, 100, 200, and 400 mg $L^{-1}$ was determined by XRF analyses (FIG. 8A-8I). The amount of Fe, Zn, and Mn in the roots gradually increased on increasing the NP's dose. At 400 mg $L^{-1}$ concentration, the abundance of Fe, Zn, and Mn reached about 48, 67, and 20 times compared to those in the control group, respectively (FIGS. 8A, 8D, and 8G). A similar increasing pattern was observed in the stem and the leaf tissues. However, the content of Fe, Zn, and Mn improved starting from the 200 mg $L^{-1}$ treatment. It seems that there is a threshold effect on the stem, where elements are stable up to 100 mg $L^{-1}$. For instance, at lower concentrations (i.e., 50 and 100 mg $L^{-1}$), NP translocation in the stem and leaf appears to be poor or limited. However, the abundance of elements at both stem and leaf tissues increased significantly upon 200 and 400 mg $L^{-1}$ treatments. In the 400 mg $L^{-1}$-treated stems, Fe, Zn, and Mn contents were about 16, 4, and 14-fold compared to the control one, respectively (FIGS. 8B, 8E, and 8H). In the leaves, 400 mg $L^{-1}$ treatment enhanced the Fe, Zn, and Mn content about 2.3, 3.7, and 6.0-fold compared to the control, respectively (FIGS. 8C, 8F, and 8I). The NPs concentration for the highest plant growth was determined at 100 mg $L^{-1}$ concentration (FIG. 8J). The upper doses limited the growth improvement.

Figure 9A:
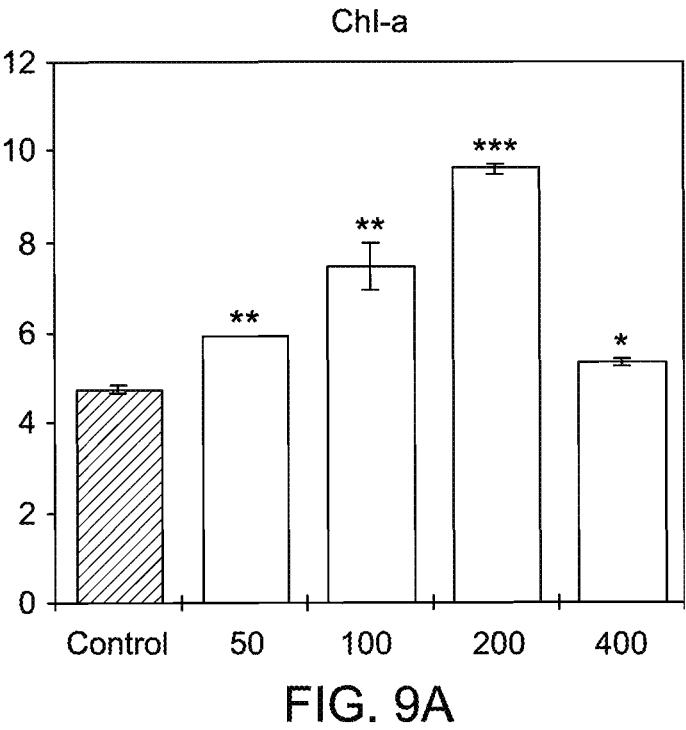
FIG. 9A shows chlorophyll (Chl) a content in mg per g (fresh weight) of leaves upon treatment with different amounts of the $Mn_{0.5}Zn_{0.5}Fe_2O_4$ NPs for three weeks, according to certain embodiments.
Figure 9B:
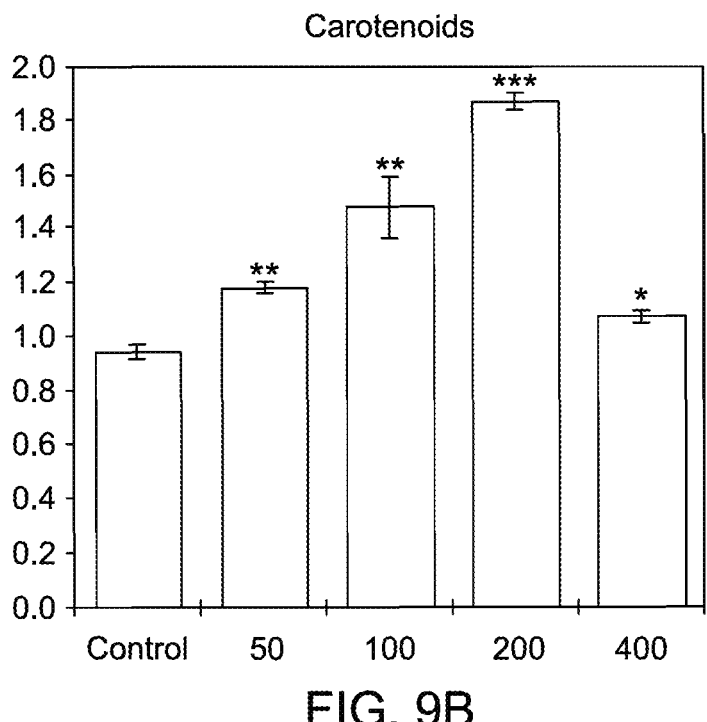
FIG. 9B shows the carotenoid content in mg per g of leaves upon treatment with different amounts of the $Mn_{0.5}Zn_{0.5}Fe_2O_4$ NPs for three weeks, according to certain embodiments.
Figure 9C:
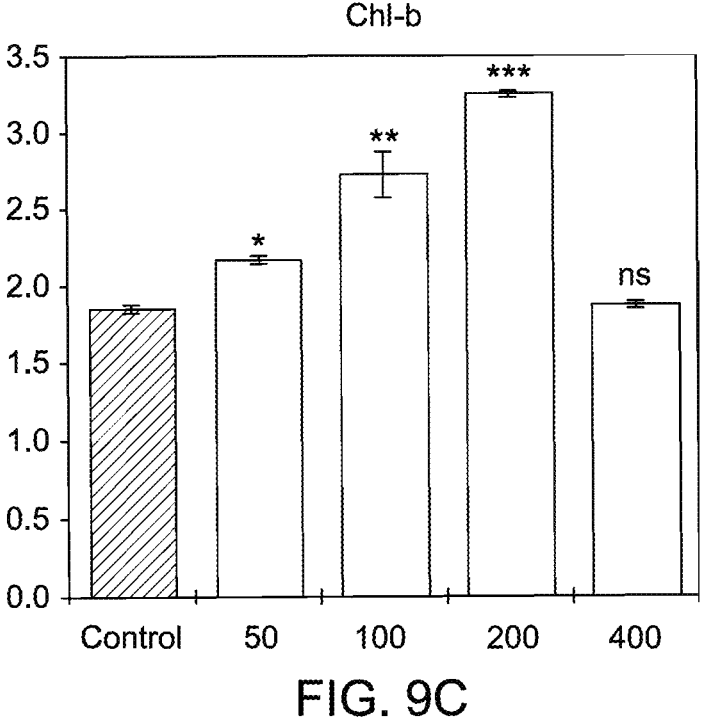
FIG. 9C shows chlorophyll (Chl) b content in mg per g of leaves upon treatment with different amounts of the $Mn_{0.5}Zn_{0.5}Fe_2O_4$ NPs for three weeks, according to certain embodiments.
Figure 9D:
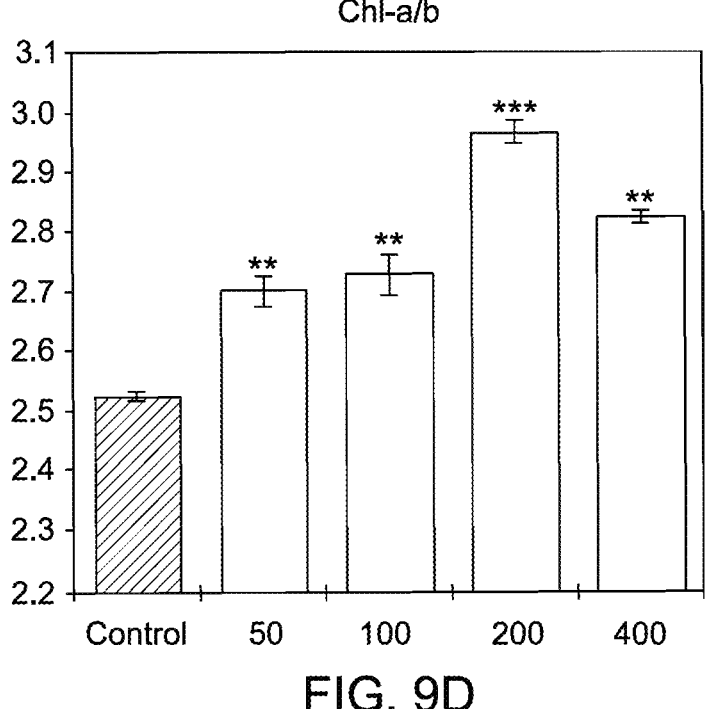
FIG. 9D shows chlorophyll (Chl) a b content in mg per g of leaves upon treatment with different amounts of the $Mn_{0.5}Zn_{0.5}Fe_2O_4$ NPs for three weeks, according to certain embodiments.

The growth performance of the pumpkin seedlings was assessed by measuring the pigment content of chlorophyll a (FIG. 9A) and chlorophyll b (FIG. 9C), carotenoids (FIG. 9B), and chlorophyll a/b ratio) (FIG. 9D). The results showed that the content of chlorophyll a and b, and carotenoids, as well as the chlorophyll a/b ratio, increased by the increasing concentrations of NPs (at least P<0.05). The increase reached the top at 200 mg/L treatment. However, 400 mg/L treatment suppressed this increase. Nevertheless, it was still higher than the control value (P<0.05). These results pointed out that MnZn spinel ferrite NPs improve the photosynthetic pigments in pumpkins. This could be attributed to the translocation of Mn, Zn, and Fe into the leaves, where they can be incorporated into the biochemical reactions as co-factors or structural elements.

Figure 10A:
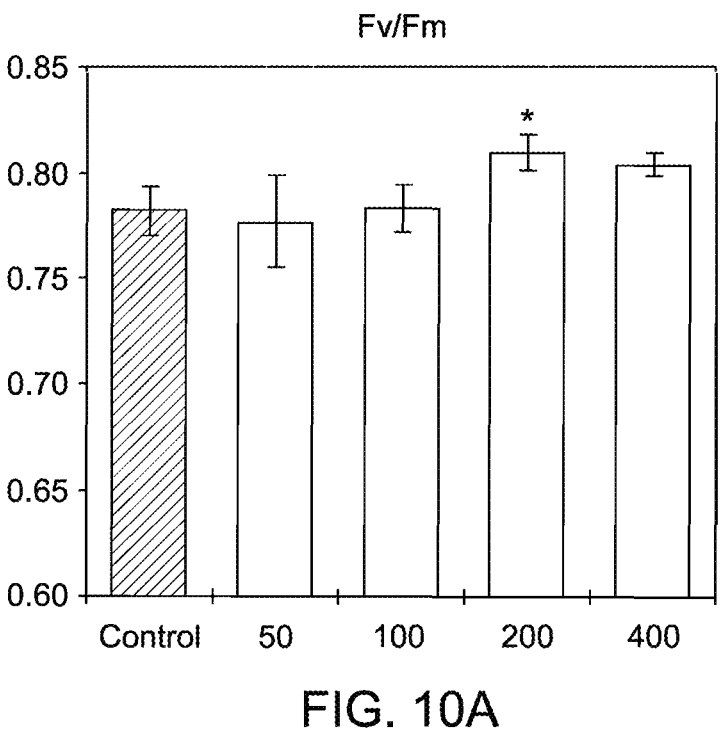
FIG. 10A shows maximum quantum efficiency (Fv/Fm) of photosystem II (PSII) of the dark-adapted plant leaves upon treatment with various concentrations of the $Mn_{0.5}Zn_{0.5}Fe_2O_4$ NPs using a pulse-amplitude-modulation (PAM) fluorometer, according to certain embodiments.
Figure 10B:
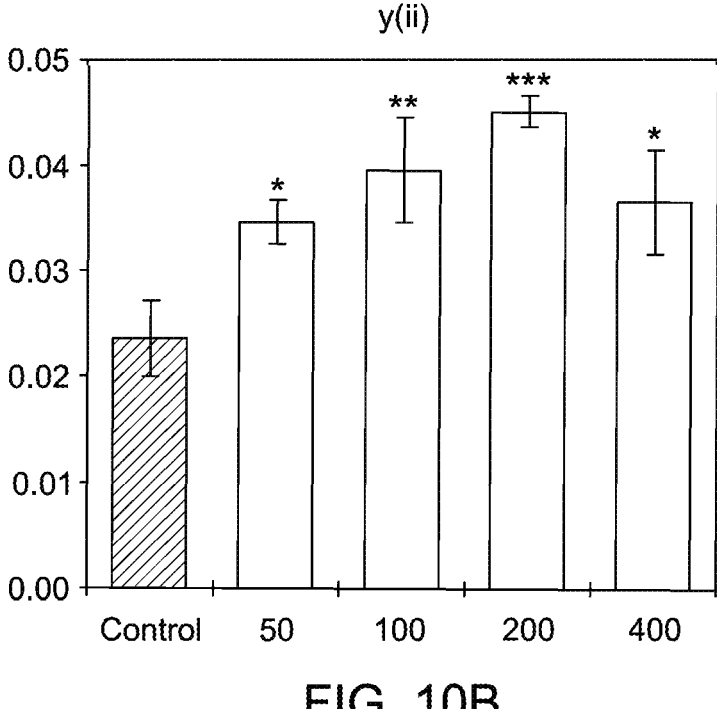
FIG. 10B shows an effective photochemical quantum yield of PS II (y (ii)) upon treatment with various concentrations of the $Mn_{0.5}Zn_{0.5}Fe_2O_4$ NPs using a PAM fluorometer, according to certain embodiments.
Figure 10C:
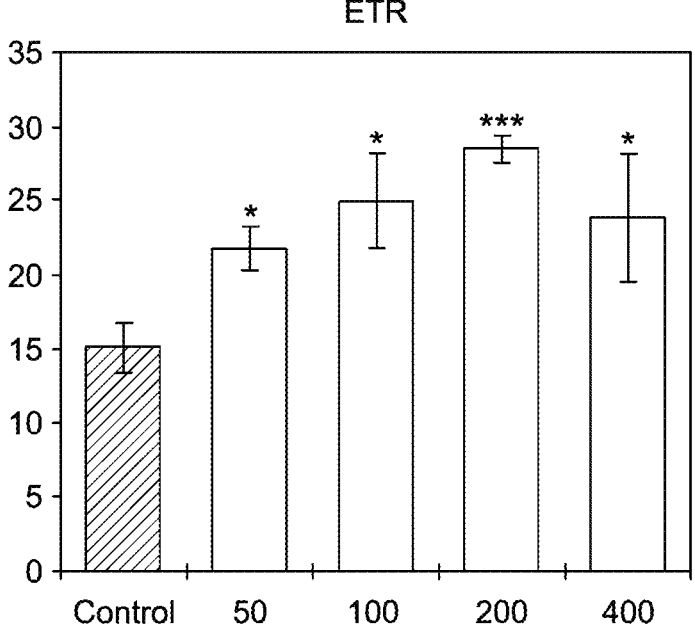
FIG. 10C electron transfer rate (ETR) upon treatment with various concentrations of the $Mn_{0.5}Zn_{0.5}Fe_2O_4$ NPs using a PAM fluorometer, according to certain embodiments.
Figure 11A:
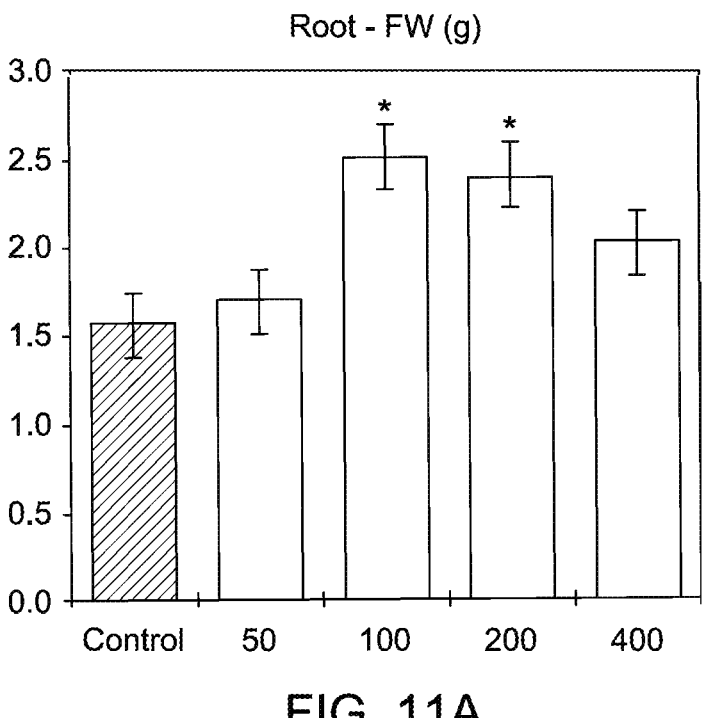
FIG. 11A shows fresh weight of the root tissues upon treatment with various concentrations of the $Mn_{0.5}Zn_{0.5}Fe_2O_4$ NPs, according to certain embodiments.
Figure 11B:
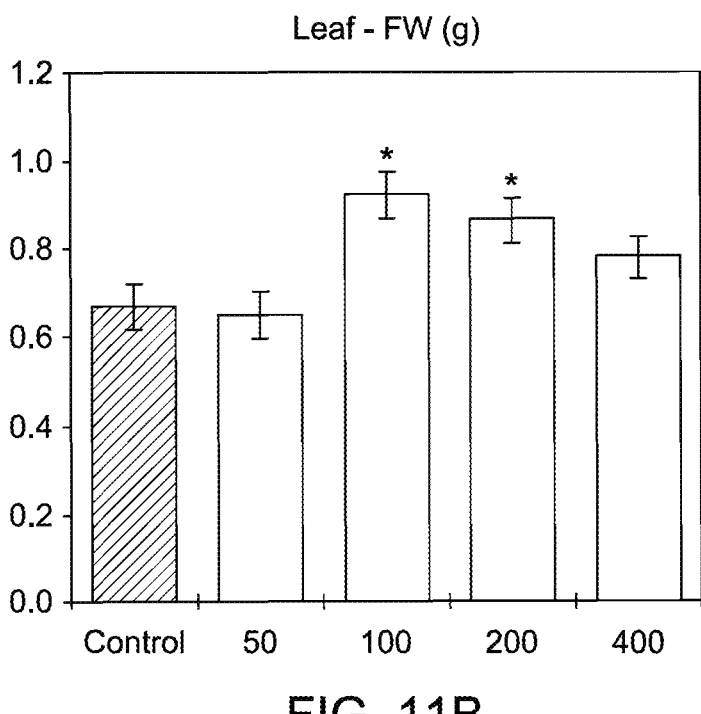
FIG. 11B shows fresh weight of the leaf tissues upon treatment with various concentrations of the $Mn_{0.5}Zn_{0.5}Fe_2O_4$ NPs, according to certain embodiments.

In addition to chlorophyll and carotenoid contents, the impact of different MnZn spinel NPs on chlorophyll fluorescence parameters was determined (FIG. 10). The Fv/Fm ratio shows the maximum quantum efficiency of photosystem II (PSII) reactions. Together with this, the effective photochemical quantum yield of photosystem II (y (ii)), and electron transport rate (ETR) during the photosynthetic reactions were probed. According to the results, the Fv/Fm ratio increased at 200 mg/L application (P<0.05) (FIG. 10A). In line with this finding, 200 mg $L^{-1}$ NP treatment also increased y (ii) and ETR levels (P<0.005) (FIG. 10B and FIG. 10C). 400 mg $L^{-1}$ suppressed this improvement. However, the y (ii) and ETR parameters were still above the control level. These results confirm the abundance of chlorophyll and carotenoid (FIG. 9), especially upon the 200 mg $L^{-1}$ treatment. At the same time, it shows that as a result of NPs application, NPs reach the leaves and increase the photosynthetic activities in the plant. The fresh weight (FW) of the root and leaf tissues confirmed these results (FIG. 11A and FIG. 11B). The highest biomass increase was observed at 100 and 200 mg $L^{-1}$ treated seedlings. Compared to the untreated control, NPs treatment improved the FW ~64% in roots, and ~40% in leaves. This result is in line with chlorophyll, carotenoids, and chlorophyll fluorescence parameters analyses.

As shown in FIG. 3, the magnitudes of magnetization were small when compared to the magnetization data of MnZn spinel ferrite NPs alone. Besides, the gradual increment in magnetization magnitude reflects that an additional factor, displaying magnetic response, has been incorporated inside the plant's roots. This confirms the successful uptake of the NPs by the roots. The uptake level increases as the concentration of magnetic NPs increases in the aqueous medium where the plants are cultivated. The higher the NPs content, the higher the magnetic response was. This was due to the smaller size of NPs, estimated as 14 nm (FIG. 2D), leading to their passive diffusion by the root cells.

In comparison to the magnitude of magnetization in the control stem sample, it is found that the magnetization magnitudes rise with the increase in the concentration of NPs (FIG. 4). The gradual increment in magnetization magnitude confirms that the uptake of magnetic NPs by the root tissues and their translocation to the stem. This level increases as the concentration of NPs increases. On the other hand, the magnitudes of magnetization for various stem tissue specimens, taken from plants grown with the addition of NPs, are small compared to the magnetization data of root samples. This reflects that not all the magnetic NPs taken up by the roots are translocated to the stem tissue. This may depend on the discrepancy in the size of magnetic NPs and the size limitation of the biological barriers (cell wall, cell membrane, sieve elements, sieve plates, etc.) constituting the stem part of the plant.

In line with the root and leaf tissues, the magnetization in the leaves grows with the increase in the concentration of the NPs (FIG. 5). However, once compared to the results of root and stem, the magnetization for leaf tissues was small. This indicates that the magnetic NPs were translocated from root to stem, until reaching leaf tissues, but with a gradual reduction which may be due to the bio-existence of biological barriers such as Casparian strip, plasmodesmata, cell membrane, cell wall, sieve elements, etc., that can restrict/limit or allow the constitution of NPs to the cells or distant tissues.

In FIG. 6, improvement in the values of $M_s$, $M_r$, and He in all tissues was attributed to the integration of magnetic nanomaterials in the interior of the plant body. These findings confirm the absorption of the NPs by the root tissue, which then translocated to other aerial parts such as stem and leaves. However, at the same level of NPs' concentration, the $M_s$ and $M_r$ values decrease with the transportation of NPs from roots to stem, until they reach the leaves. This indicates the reduction in the concentration of the NPs when they are translocated. Nevertheless, the $H_c$ values increase for the same concentration of the NPs when going from roots to stem and finally to leaves. These results reflect that the size of magnetic NPs plays a role in their translocation to different plant tissues. In other words, the smaller the size of the NPs, the higher the plant uptake and translocation to various tissues. This could be related to the diversity in the sizes of different barriers residing in tissues, vascular bundles, epidermis, cells, etc., for instance, NPs that display high surface area may be linked with carrier proteins or organic molecules that exist in the aqueous medium, allowing NPs to be absorbed by them.

The XRD analyses revealed the existence of NPs in roots (FIG. 7), but not in the stem and leaves. This could be related to the quantity of magnetic NPs reaching to the stem and leaf, which is very limited and stay below the detection limit of XRD. However, this small amount was detected by VSM as shown in FIG. 5 and XRF as shown in FIG. 8. The XRF analyses revealed that the abundance of the elements that forms the NPs (i.e., Fe, Zn, and Mn) raised at most in the roots, then in the stem, and in the leaves, which is in line with VSM (FIG. 3 to FIG. 6) and XRD (FIG. 7) results. This was attributed to the translocation rate of the elements, which is the highest in the roots than in the stems and the leaves, respectively. Besides, this result shows the root-to-leaf translocation of NPs. However, it is unclear whether these elements reside in tissues either in the form of NPs or as elements. For instance, acidic environments (i.e., rhizo-sphere), or organelles (i.e., lysosome) can help to free the elements that are found in the composition of the NPs. Once released, they can incorporate in biochemical reactions or into the structure of biomolecules. For instance, Mn is required for photosynthesis and also acts as a cofactor of numerous enzymes. Zn is the sole metal ion found in all six enzyme classes and a structural component of numerous transcription factors. Fe is required for many enzymatic reactions such as photosynthesis, respiration, and DNA and chlorophyll synthesis. Mn, Zn and Fe deficiencies cause chlorosis and impair many physiological processes, including photosynthesis and defense mechanisms. The results indicate that 100 and 200 mg L$^{-1}$ are the highest performing NPs concentrations for the most efficient photosynthesis and growth (FIGS. 9-11), however, higher concentrations led to growth retardation.

Numerous modifications and variations of the present invention are possible in light of the above teachings. It is therefore to be understood that within the scope of the appended claims, the invention may be practiced otherwise than as specifically described herein

The invention claimed is:

1. A method of fertilizing growing a pumpkin plant, comprising:

contacting the root system of a cultivated pumpkin plant, with an aqueous composition comprising:

from 100 mg L$^{-1}$ to 200 mg L$^{-1}$ of a spinel ferrite having a cubic crystal system and in the form of spherical particles of $Mn_{0.5}Zn_{0.5}Fe_2O_4$ having an average diameter of from 10 nm to 20 nm;

wherein the contacting comprises submerging at least partially the root system of the plant in the aqueous composition for a period of from 10 to 20 days.

2. The method of claim 1, wherein the fertilizer solution is continuously pumped with air during the contacting.

3. The method of claim 1, wherein the composition further comprises at least one compound selected from potassium nitrate, calcium nitrate, magnesium sulfate, potassium dihy-drogen phosphate, ammonium dihydrogen phosphate, man-ganese chloride, zinc sulfate, copper sulfate, molybdic acid, sodium molybdate, ferric tartrate, iron (iii)-EDTA, and hydrates thereof.

4. The method of claim 1, wherein the pumpkin plant is cultivated at a temperature of from 22° C. to 25° C., a relative humidity of from 55% to 70%, and from 14 to 18 hours of light per day.

5. The method of claim 1, wherein the pumpkin plant has at least a 40% increase in leaf size over the period compared to a plant cultivated under the same conditions but without contacting with the composition.

6. The method of claim 1, wherein the pumpkin plant is a *Cucurbita maxima* pumpkin plant.

7. The method of claim 1, wherein the composition further comprises a pesticide.

8. The method of claim 7, wherein the pesticide is attached to a surface of the particles of the spinel ferrite.

9. The method of claim 1, wherein a leaf of the pumpkin plant has a saturation magnetization value of 0.3 emu/g after 7 days of contact with the solution.

\* \* \* \* \*